(12) United States Patent
Sion

(10) Patent No.: US 11,178,153 B2
(45) Date of Patent: Nov. 16, 2021

(54) METHOD FOR THE INTEGRATED USE OF A SECONDARY CLOUD RESOURCE

(71) Applicant: PRIVATE MACHINES INC., Brooklyn, NY (US)

(72) Inventor: Radu Sion, Brooklyn, NY (US)

(73) Assignee: Private Machines Inc., Brooklyn, NY (US)

( * ) Notice: Subject to any disclaimer, the term of this patent is extended or adjusted under 35 U.S.C. 154(b) by 133 days.

(21) Appl. No.: 16/584,832

(22) Filed: Sep. 26, 2019

(65) Prior Publication Data
US 2020/0106782 A1 Apr. 2, 2020

Related U.S. Application Data

(60) Provisional application No. 62/738,969, filed on Sep. 28, 2018.

(51) Int. Cl.
*H04L 29/06* (2006.01)
*H04L 29/08* (2006.01)

(52) U.S. Cl.
CPC .......... *H04L 63/102* (2013.01); *H04L 63/083* (2013.01); *H04L 63/18* (2013.01); *H04L 63/20* (2013.01); *H04L 67/10* (2013.01); *H04L 63/0272* (2013.01)

(58) Field of Classification Search
CPC ....... H04L 63/083; H04L 63/18; H04L 63/20; H04L 63/0272; H04L 67/10; H04L 67/1097; H04L 47/827
USPC .......................................................... 726/5
See application file for complete search history.

(56) References Cited

U.S. PATENT DOCUMENTS

| | | | |
|---|---|---|---|
| 8,880,678 B1 * | 11/2014 | Colton | G06F 9/5072 709/224 |
| 9,928,517 B1 * | 3/2018 | Hitchcock | H04L 41/14 |
| 10,007,811 B2 | 6/2018 | Sion | |
| 2002/0016838 A1 * | 2/2002 | Geluc | H04L 63/101 709/224 |

(Continued)

FOREIGN PATENT DOCUMENTS

| | | |
|---|---|---|
| WO | 2016099644 A1 | 6/2016 |
| WO | 2016137573 A1 | 9/2016 |
| WO | 2019069159 A1 | 4/2019 |

*Primary Examiner* — Ruolei Zong
(74) *Attorney, Agent, or Firm* — The Law Office of Daniel T. Weglarz, P.C.

(57) ABSTRACT

A method for the integrated use of a secondary cloud resource, provided by a secondary cloud service software function executed on secondary hardware, from a primary cloud service, provided by a primary cloud service software function executed on primary hardware which is remote to said secondary hardware including provision step operative to provide a primary integration interface and a secondary integration interface, a resource request step operative to identify a set of secondary user data and request said secondary cloud resource from the secondary cloud service, a resource allocation step for allocating the requested secondary cloud resource and providing corresponding secondary cloud resource allocation information, an information association step for associating said secondary cloud resource allocation information with said secondary cloud user data and a set of primary user data, and a user authentication step for authenticating the primary cloud service user access to said secondary cloud resource.

17 Claims, 10 Drawing Sheets

(56) References Cited

U.S. PATENT DOCUMENTS

| | | | |
|---|---|---|---|
| 2005/0216414 A1* | 9/2005 | Higuchi | G06F 21/125 705/51 |
| 2011/0016214 A1* | 1/2011 | Jackson | G06F 9/505 709/226 |
| 2011/0137805 A1* | 6/2011 | Brookbanks | G06Q 50/188 705/80 |
| 2012/0278812 A1 | 11/2012 | Wang | |
| 2013/0061306 A1 | 3/2013 | Sinn | |
| 2013/0291121 A1 | 10/2013 | Iovanov et al. | |
| 2013/0311778 A1* | 11/2013 | Cherukuri | H04L 63/0272 713/171 |
| 2014/0280821 A1* | 9/2014 | Maitland | H04L 41/0668 709/223 |
| 2014/0280948 A1 | 9/2014 | Schmidt et al. | |
| 2016/0359672 A1* | 12/2016 | Blair | H04L 41/5019 |
| 2017/0214632 A1* | 7/2017 | Ravi | H04L 41/0896 |
| 2017/0339070 A1 | 11/2017 | Chang et al. | |
| 2017/0351879 A1 | 12/2017 | Sion | |
| 2018/0088982 A1* | 3/2018 | Abrams | G06F 9/5077 |
| 2018/0270201 A1* | 9/2018 | Chanak | H04L 63/0272 |
| 2018/0276421 A1 | 9/2018 | Sion | |

\* cited by examiner

METHOD FOR THE INTEGRATED USE OF A SECONDARY CLOUD RESOURCE

This application claims the benefit of and incorporates by reference U.S. provisional application Ser. No. 62/738,969, filed in the United States on Sep. 28, 2018.

The present invention relates to a method for the integrated use, in or from a primary cloud service, of a secondary cloud resource. The invention also relates to a system arranged to achieve and provide such integrated use, and also to a software function arranged to achieve and provide such integrated use.

More concretely, the invention relates to a software architecture for integrating one set of cloud services within another and "endowing" one set of "primary" cloud services with properties derived from other "secondary" cloud services.

Cloud services are used more and more frequently, and security is a concern. Different cloud services are associated with different levels of security offered to their users. The present invention provides a way to increase the security of services offered by a primary standard cloud without having to change the fundamental architecture of such a primary standard cloud, by endowing it with advanced security properties of one or more secondary secure clouds. In this case, the secondary secure cloud is the "source" of this endowment, while the primary standard cloud is the "target" of the endowment.

The invention achieves such an endowment of properties in a way which may be completely transparent to the users of the target cloud. Hence, using the present invention, partial or even full transparency can be provided for integration. In other words, users of the endowed services may be essentially unaware of the set of cloud services that are the source of endowment properties.

Furthermore, users of a standard cloud may verify the security properties endowed onto the standard cloud service from a secure cloud service.

The endowment of properties provided by the present invention may also be reciprocal. Hence, roles of the endowed and endowing services may be reversed. For any cloud services A and B certain properties of A may be endowed on B, while certain properties of B may be endowed on A.

BACKGROUND

Cloud Service: As the word is used herein, a "cloud service" refers to any offering of on-demand computation, storage, or other type of resource which is provided remotely, over a network such as the internet. For example, existing virtualization-based cloud services, data centers, and server farms (the terms "cloud", "server farm", "data center" are used interchangeably throughout this description) may use so-called hypervisor technology running on hardware servers to allocate virtual execution environments (VEE) such as virtual machines (VMs) and thus share the same server hardware across multiple users' workloads.

This is cost-effective, and users can allocate any number of VEEs that can run on different servers or on the same servers simultaneously. Virtualization may be used to share the underlying CPUs across multiple users and thus increase overall hardware utilization. In standard cloud contexts, allocated VEEs may also be known as "compute instances", or simply "instances".

A cloud service may offer Application Programming Interfaces (API) endpoints or portals (or both) using which clients can allocate one or more VEEs and use them on-demand. Typically cloud clients allocate VEEs by specifying the software that they need to run, the so-called "images". These images may come in different binary formats and may comprise an operating system kernel, a "root disk" containing software, as well as additional code. In the following we will use "clients" and "users" interchangeably.

Further, cloud users typically belong to cloud "accounts"; an account may have multiple users. For example, a large enterprise may set up an account and then have multiple users in that account. Such an account may, for instance, be associated with parameters defining an allowed set or type of users which can be created and used within the account in question, including access rights control.

To fully enable complex enterprise applications, cloud services may comprise sub-services such as networking, storage, auto-provisioning, and managed applications.

Standard Cloud Service: Throughout this disclosure, we will use "standard cloud service" to denote any conventional set of cloud services. In a typical case, a standard cloud service does not provide efficient protection of the workloads in a secure manner. This may include access threats from insiders and the cloud provider, as well as other security threats.

Specifically, in a typical standard cloud service, the cloud provider, data center operators, and various untrusted insiders have unfettered physical access to the underlying hardware infrastructure and its hosted business data and software. Access to the underlying infrastructure means that privacy of clients' data and computation running on cloud-hosted hardware is not protected from the cloud provider and data center operators.

Although a standard cloud service may provide network isolation and standard encryption and cryptographic hardware for key management, these mechanisms are often not enough to protect clients' data and computation. Once active, clients' workloads, keys, and data are fully exposed to the cloud operator with access to the hardware or any virtualization software.

For example, even if client data and software are encrypted at rest, at runtime data needs to be decrypted and the software needs to be run for example inside VEEs in turn running on cloud-provided traditional unsecured hardware. In this case, associated memory and CPUs are accessible to data center operators and untrusted insiders, e.g., with physical or logical access to the infrastructure.

Secure Cloud Service: Unlike a standard cloud service, a secure cloud service may provide full privacy, integrity and other security properties for clients' data and computation. For example, in a secure cloud service, the cloud provider, data center operators, and untrusted insiders may not be able to access clients' data and computation even with physical access to the underlying servers (or hardware) hosting the VEEs.

Hence, as used herein, the term "secure cloud service" is associated with a higher degree of security than a "standard cloud service". Specifically, a "secondary" cloud service is associated with a higher degree of security than a "primary" cloud service. This degree of security may be purely software-dependent. However, the preferred case is when the higher degree of security is based upon hardware aspects of the secondary cloud service that are not present within the primary cloud service.

An example of high-security hardware is provided in WO 2016/137573 A1 which discloses a tamper-protected unit under the name "ENFORCER blade" (80), which is a tamper-protected computer module featuring a modular design. It provides a tamper-protected enclosure that can protect and connect off-the-shelf general-purpose motherboards through an Internal IPM (Information Processing Module) Decoupler component (136). This results in a cost-effective design that can be mass-produced and reused to protect different general-purpose off-the-shelf motherboards, across multiple generations and builds, using the same anti-tamper enclosure design, without the need for re-certification. Only the tamper-protected computer module, which stays the same even after a change of IPM, needs such classification.

WO 2016/099644 A1 discloses various ways of deploying such tamper-protected units in a network environment. The solution described therein is denoted "CipherRack".

FIG. 18 illustrates an example of tamper-protected computer modules 80 of the general type described in WO 2016/137573 A1 and denoted "ENFORCER blade" therein.

Hence, the tamper-protected computer module 80 comprises one or more layers of encapsulating material 146, within one or more enclosing layers 162. Integrated within at least one of said enclosing layers 162 there are tamper-detecting sensors 120, as well as a number of components including: an information processing module (IPM) 128, internal power connectors 116, IPM connectors (or decouplers) 136, communication circuitry ("communication bridge") 152, a cryptographic module 140 (also named "security anchor"), a clock component 114, a digital memory component 112 and a battery-backed memory component 110.

The IPM 128 in turn comprises a communication conduit 132, arranged to provide a digital wired communication interface to the tamper-protected computer module 80 inside which the IPM 182 sits, and a power conduit 124, arranged to receive power from said module 80.

The tamper-protected computer module 80 also comprises a number of externally accessible connectors, including a communication port 156 (e.g., Ethernet 10 Gbps connector), a control panel 160, a battery socket 100 (which may be arranged with batteries 104), a reset port 109, and a power port 108. Of course, other configuration are possible, in addition to the exemplifying one shown in FIG. 18.

Such tamper-protected computer modules 80 are designed to allow the secure and private execution of software by remote users. A user can remotely and securely verify that (i) each used module 80 has not been physically or logically tampered with, and that (ii) software currently executing on the module 80 in question is indeed what has been previously provided by the user. Further, after use, the modules 80 can guarantee that all information of any previous user has been zeroized and that the module 80 has been restored to a secure state, the "initial secure state" (or "S0"), as described in closer detail in WO 2016/099644 A1. Thus, a user does not have to worry about information leaking to the next user, and a next user can use the module 80 safely, without worrying about compromise from the previous user.

Furthermore, the module 80 also offers access to specialized cryptographic services, provided by the crypto module 140. The IPM 128 is arranged to communicate with the crypto module 140 to access cryptographic and management services provided by the crypto module 140, such as status updates etc. Such services are further detailed in the above referenced international patent publications.

Specifically, in one embodiment, the tamper-protected module 80 makes use of a universal, general-purpose anti-tamper enclosure design comprising one or more enclosing layers 162. An enclosing layer 162 may provide a physical encasing, such as a strong protective shell, that surrounds other portions of the module 80. An enclosing layer 162 may enclose a layer of encapsulating material 146. Various module 80 components or circuitry may be embedded within or built into the encapsulating material 146. In one embodiment, each enclosing layer 162 encloses a corresponding layer of encapsulating material 146.

The enclosing layer 162 may be a specially designed enclosure formed from machined aluminium AL 6061. The encapsulating material 146 may comprise a special resin potting or epoxy, such as the S7527 or S7302 special resins or the Kryptos 17 potting.

The module 80 may further comprise a plurality of enclosing layers 162 that may be nested, one within another, effectively constituting an "onion" of enclosing layers 162. The module 80 may further comprise an encapsulating material 146 between any two such enclosing layers 162. Different enclosing layers 162 may be formed from different materials or combinations of materials, which may be hard or soft. Different instances of encapsulating material 146, such as those enclosed by different enclosing layers 162, may likewise be comprised of different materials or combinations of materials.

Individual enclosing layers 162 and layers of encapsulating material 146 may each be fitted with different tamper-detecting, tamper-respondent, or other anti-tamper capabilities, including different types of tamper-detecting sensors 120 and different types of zeroization support logic. For example, a first enclosing layer 162 may provide a physical-penetration detection capability using an electro-capacitive or impedance-altering conductive foil sensor, whereas a second enclosing layer 162 may comprise a mesh of temperature sensors embedded in thermally conductive adhesive. Likewise, a first layer of encapsulating material 146 may comprise different anti-tamper properties than a second layer of encapsulating material 146. Furthermore, an enclosing layer 162 may comprise the same or different anti-tamper properties compared to a layer of encapsulating material 146.

An exemplifying embodiment of the tamper-protected module 80 may comprise at least one tamper-detecting sensor 120. A tamper-detecting sensor 120 includes any sensor deployed in the context of securing an anti-tamper design. For example, the tamper-detecting sensor 120 may include a sensor configured to detect, relative to a predefined range, changes in temperature, mechanical pressure, atmospheric pressure, radiation, voltage, UV, impedance, electrical current, or any other system or environment property. The tamper-detecting sensor 120 may also comprise an intrusion detection circuit. Any number of tamper-detecting sensors 120, of the same or differing types, may be embedded in any given enclosing layer 162 or encapsulating material 146, such as a light sensor, a temperature sensor, a microphone sensor, a vibration sensor and an electric circuit disconnection or breaking sensor.

The module 80 may include at least one memory module 112 configured to store information. Memory module 112 may be any circuitry configured to contain information, such as SRAM, DRAM, FLASH, ROM, PROM, EPROM memory chips, communication buffers, communication conduits, and so on. A memory module 112 may be internal to a cryptography module 140 as shown in FIG. 18, or external to the cryptography module.

At least one memory module 112 may be a battery-backed memory module 110. The module 80 may include any number of memory modules 112 and battery-backed memory modules 110, including none at all. For the purposes of this disclosure, a battery-backed memory module 110 is a type of memory module 112 that is configured to be connected to a battery. Some or all of memory module 112 and battery-backed memory module 110 may be connected to a general circuitry main power supply of the tamper-protected computer module 80. The battery-backed memory module 110 may be configured to preserve any data stored in it, even after main power is removed. A battery-backed memory module 110 may be used for storing information that needs to be preserved across transitions between multiple customers, parties, vendors, and the like, or during periods when the module 80 does not have access to its main power supplies. A battery-backed memory module 110 may be internal to the cryptography module 140 as shown in FIG. 18, or external to the cryptography module.

Any memory module 112 or battery-backed memory module 110 may be a zeroizable memory module, in other words a type of memory module 112 or battery-backed memory module 110 that contains or is tightly integrated with zeroization support logic, arranged to zeroized the memory at the detection of a security breach of the module.

The tamper-protected module 80 may also comprise the clock ("CLK") 114. For example, the clock 114 may be used in time-stamping communication between internal components of the module 80, or between an externally arranged party and module 80 internal components.

The cryptography module (crypto module) 140 may comprise hardware, software, firmware, or some combination thereof, configured to implement cryptographic logic or cryptographic processes, including cryptographic algorithms and functions, such as asymmetric and symmetric key encryption, cryptographic hash functions, the generation of random numbers, and other cryptographic logic or processes known in the art. Crypto module 140 may include additional features, such as internal FLASH memory, a tamper-respondent design, battery-backed memory, and a real-time clock. Examples of crypto modules include the MAXQ1850 DeepCover Secure Microcontroller with Rapid Zeroization Technology and Cryptography, and the MAX32550 DeepCover Secure Cortex-M3 Flash Microcontroller.

FIG. 18 depicts an embodiment of the module 80 in which a memory module 112, a battery-backed memory module 110, and a clock 114 are arranged internally to the crypto module 140. To the contrary, in other embodiments of the module 80, the memory module 112, battery-backed memory module 110, and clock 114 may be arranged externally to the crypto module 140.

The tamper-protected computer module 80 may be adapted to receive, accommodate and completely enclose the information processing module 128, and to utilize the information processing functionality provided by such information processing module 128. For purposes of this disclosure, an IPM 128 is a module that may receive inputs, such as those of a digital or analog nature; compute a digital, mathematical, mechanical, or signal processing function; and produce outputs, such as those of a digital or analog nature. An IPM 128 may contain circuitry configured to provide a desired information processing functionality of the module 80. Conceptually, the IPM 128 may represent a modular instance of a subset of the CPC of a module 80. The IPM 128 may comprise an information bus, input-output circuitry, a central processing unit, a memory module, and zeroization support logic.

In one embodiment, the IPM 128 is, preferably releasably, connected to a physical connector of the tamper-protected module 80. Hence, the module 80 is then configured to receive at least one, preferably several, IPM's 128, which IPM'2 128 are then considered an independent component capable of utilization by the module 80.

Various types of information processing modules are known in the art. An IPM 128 may comprise one or more central processing units (CPUs), memory, input/output circuitry, communication conduits, RAM, or a number of additional support circuitry. Examples of such IPMs 128 include computers, laptops, credit-card-sized "mini" computers such as the Raspberry Pi, Arduino, Banana Pi, and BeagleBone, and digital signal processing modules. The CPU may be of a standard off-the-shelf architecture, such as x86 produced by Intel and AMD; ARM produced by HP, Samsung, and Qualcomm; or PowerPC produced by IBM, Microsoft, Sony, Toshiba, and Freescale. Alternatively, the CPU may be of a custom design.

The IPM 128 may be built from mass-produced components familiar in the smartphone and general mobile/ARM markets, such as an ARM Cortex-derived smartphone system on chip (SoC), the Raspberry Pi, Arduino, Banana Pi, and BeagleBone, and the Samsung Exynos ARM SoC, or it may be a mass-produced computer or server motherboards, or circuitry of a custom design. One or more of any IPM 128 used in module 80 may include guidance circuitry, such as avionics guidance circuitry, naval guidance circuitry, satellite guidance circuitry, missile guidance circuitry. Additionally or alternatively, any IPM 128 may include non-guidance circuitry, including digital signal processing (DSP) circuitry, such as the off-the-shelf Texas Instruments Ultra-lower Power DSP system on chip.

One embodiment of the tamper-protected computer module 80 comprises an internal IPM decoupler 136 configured to connect with, such that the module 80 may utilize the functionality of, at least one electronic component, and physically decouple such electronic component from the module 80, and logically decouple such component from the R&D or certification of the system 80. Examples of such electronic component include the IPM 128 and the cryptography module 140. For instance, in one embodiment, the internal IPM decoupler 136 is configured to provide a modular design of tamper-protected module 80 such that a different or higher-performing IPM 128 may be utilized by the module 80, even as the system's design is updated, and without requiring recertification or additional system redesign. This is described in detail in WO 2016/137573 A1, referenced above.

Further, the modular system design provided by the internal IPM decoupler 136 may also provide the tamper-protected 80 compatibility with a plurality of IPM 128 designs. For example the module 80 design may utilize a general-purpose programmable computation IPM 128, such as a general-purpose computer motherboard in turn comprising various components.

Elements of the tamper-protected 80 may undergo thorough testing and certification independent of the selection of the type of IPM 128 that the module 80 will ultimately utilize. This enables the information processing functionality of the module 80 to be selected subsequently. The selected information processing functionality may then be provided by simply connecting a corresponding IPM 128 with the internal IPM decoupler 136, thus installing the IPM 128 in the module 80. Such installation of a desired IPM 128 may occur prior to the module 80 being physically sealed and delivered to a customer.

In one embodiment, the internal IPM decoupler 136 may comprise a port of a known type, such as DVI, HDMI, USB, or Ethernet port. Or, a custom-designed internal IPM decoupler 136 may be utilized, such as one with reinforced electrical conduits for a USB connector that enables it to carry higher voltages and higher currents than otherwise possible. In one embodiment, the internal IPM decoupler 136 is configured such that an IPM 128 may easily be "plugged in" at the factory, before the module 80 is physically sealed.

The tamper-protected computer module 80 may further comprise an internal power connector 116 configured to supply power to the module 80 or an IPM 128. In one embodiment, the internal IPM decoupler 136 and the internal power connector 116 may be structurally linked, situated within each other, or both. FIG. 18 depicts an embodiment in which the internal power connector 116 is situated within the internal IPM decoupler 136. In other cases, the internal power connector 116 may be structurally separate from the internal IPM decoupler 136.

In cryptography, power analysis is an attack in which the attacker studies the power consumption of a cryptographic hardware device (such as a smart card, tamper-resistant "black box," or integrated circuit) with the goal of extracting cryptographic keys and other secret information from the device.

In one embodiment, the internal power connector 116 and the internal IPM decoupler 136 may comprise defenses against differential power analysis attacks. For example, the power circuitry may be designed so as to ensure a power draw that is unrelated to the internal processing or data contained within. This can be achieved by numerous means, including a simple two-capacitor scheme in which external power charges two capacitors in turn and the internal circuitry only powers up from one of the capacitors that is not currently being charged, thus separating power consumption from power delivery. Further, low-pass electrical filters can be placed on any power-related conduits to prevent egress of any sensitive internal signals.

The tamper-protected computer module 80 may further comprise an external power supply port 108. The power supply port 108 may be of a standard existing type, such as a coaxial power connector, a Molex connector, Tamiya connector, or SAE connector; or of a custom design. In one embodiment, the power supply port 108 may be structurally connected with the external communication port 156. In an alternate embodiment, the power supply port 108 and the external communication port 156 may be structurally separate.

In one embodiment, the module 80 may use the external power supply port 108 or other components to allow wireless or contactless power delivery in which power is provided without a physical connection to an external power source, such as by using electromagnetic radiation or induction principles.

In an embodiment, the tamper-protected module 80 may comprise an external battery connection socket 100 configure to receive one or more batteries 104. In one embodiment, the tamper-protected module 80 is configured such that removing or otherwise disconnecting any or all batteries 104 is perceived by the module as a tampering attempt. In this manner, the module may require connection with at least one battery 104 to provide a power source for the battery-backed memory module 110. Disconnecting all batteries 104 may perturb proper functioning of the system 80.

The module 80 may comprise a digital communication port 156 configured to provide an interface between the module 80 and external devices. The communication port 156 may be externally accessible, i.e., from outside the module 80. Typical known uses of communication ports include connecting a computer to a monitor, webcam, speakers, or other peripheral device. On the physical layer, a communication port may be a specialized outlet configured to receive a plug or cable. Electronically, conductors where port and cable contacts connect may provide means to transfer signals between devices. The communication port 156 may be of a standard existing type, such as PCIe, serial, parallel, DVI, HDMI, USB, Ethernet, DIMM, and SOD IMM, or of a custom design.

The communication bridge 152 may comprise hardware, software, firmware, or some combination thereof, configured to interconnect a plurality of digital or analog devices. A simplistic example of a communication bridge is a simple electrical conduit, while more complex designs include traditional bus or hub architectures. The communication bridge 152 provides means for components of the module 80 to communicate with each other or with an external device. In one embodiment, the communication bridge 152 interconnects any or all of the following: the sensors 120, the internal IPM decoupler 136, the crypto module 140, the memory module 112, the battery-backed memory module 110, and the externally-accessible communication port 156.

In one embodiment, the IPM 128 may comprise a power conduit 124, which may be configured to connect to the internal power connector 116. The power conduit 124 and the internal power connector 116 may be structurally linked, as depicted in FIG. 18; situated one within the other; or both. In one embodiment, the power conduit 124 serves as a means for the IPM 128 to draw power from the internal power connector 116 and distribute the power to the IPM 128 components.

In an embodiment, the IPM 128 may comprise a communication conduit 132, which may be configured to connect to the Internal IPM decoupler 136. In one embodiment, the communication conduit 132 serves as a means for the IPM 128 to communicate with other components of the module 80, such as the communication bridge 152 and the crypto module 140, by connecting through the internal IPM decoupler 136.

In one embodiment, internal circuitry, including the internal IPM decoupler 136, the IPM 128, the communication bridge 152, the crypto module 140, memory module 112, battery-backed memory module 110, and the clock 114, may be contained within at least one enclosing layer 162 or encapsulating material 146.

The zeroization support logic (ZSL) may connect with ZSL external to the IPM 128, such as ZSL part of the internal power connector 116, or ZSL part of the internal IPM decoupler 136. Moreover, any component of the tamper-protected module 80 may be fitted with some form of ZSL. The ZSL in any component may cooperate with the ZSL in any component or components.

In one embodiment, zeroization support logic such as the ZSL part of the IPM 128, ZSL part of the internal power connector 116, ZSL part of the internal IPM decoupler 136, or ZSL residing in an enclosing layer 162 or encapsulating material 146 may include an electric charge capacitor, a reinforced electrical conduit configured for transportation of high-voltage current to a zeroizable memory module to be zeroized, a combustibly destructive microelectronic circuit board interconnection, a sheet of pyrofuse foil that may be electrically activated, or other forms of ZSL known in the art.

In an embodiment, separate ZSL may reside in any enclosing layer 162 or encapsulating material 146 of the module 80. The ZSL residing in a layer 162 may be configured to connect with the communication bridge 152 or other system components.

The crypto module 140 may aid in zeroization of any component of the module 80. For example, in one embodiment, the tamper-detecting sensors 120 are connected to the crypto module 140. When the crypto module 140 becomes aware of a tamper event through communication with the tamper-detecting sensors 120, the crypto module instructs the zeroizable memory module 112 to zeroize. The crypto module 140 may also connect to the internal IPM decoupler 136, the internal power connector 116, the ZSL within the internal IPM decoupler, the ZSL within the internal power connector, the ZSL within an enclosing layer 162 or encapsulating material 146, or any combination thereof, and request zeroization.

In one embodiment, the crypto module 140 may be further configured to control the electrical signals pertaining to the internal IPM decoupler 136, the internal power connector 116, the communication bridge 152 and other internal components. For example, the crypto module 140 may be configured to turn on or off the IPM 128 either based on a certain pre-defined condition, such as an electrical assumption being violated, or dynamically as directed by specialized firmware running inside the crypto module 140. Further, the crypto module 140 may be configured to judiciously alter the data signals the IPM 128 receives through the communication bridge 152 or the internal IPM decoupler 136, for example by adding or removing certain packet header information or suppressing certain data fields.

In one embodiment, when a tampering event is detected by a tamper-detecting sensor 120, the ZSLs external to the IPM 128 cooperate with the ZSL internal to the IPM 128 to zeroize the information stored in a IPM memory module 312. The zeroization method employed may be conventional as such, useful examples are provided in U.S. Pat. Nos. 4,860,351 A and 3,882,324 A.

In one embodiment, the tamper-protected module 80 may comprise at least one reset module 109 configured to restore the module to an initial pre-used state.

In one embodiment, the tamper-protected module 80 may comprise a control panel 160 configured to provide a communication link for components internal to the module to communicate with external parties, including communications from external parties to components internal to the system.

In one embodiment, any of the following components may be situated within, or structurally linked to, any other such component, or both: the control panel 160, the communication port 156, the reset module 109, the power connector 108, and the battery connection socket 100.

In one embodiment, the crypto module 140 may use the communication bridge 152 to communicate with third parties through the external communication port 156 or control panel 160, in the process of enforcing security assurances of the tamper-protected computer module 80. For example, the crypto module 140 may engage in a verification protocol with a third party in an attempt to prove that the module 80 has been manufactured by a trusted vendor and that no tampering has been detected yet. To this end, the crypto module 140 may also communicate with the IPM 128 using the communication bridge 152, the communication conduit 132, and the internal IPM decoupler 136.

In an alternate embodiment, the IPM 128 may engage in said verification protocol and communicate with third parties using the communication bridge 152, the communication conduit 132, and the internal IPM decoupler 136. The IPM 128 may also request the aid of the crypto module 140 through the communication bridge 152, the communication conduit 132, and the internal IPM decoupler 136.

One of the important services offered by the security anchor 140 is a witnessing service. Such a witnessing service may be arranged to record and cryptographically securely store information regarding historic state changes of the IPM 128, for third parties to verify via a witnessing interface. State changes at varying degrees of granularity may be witnessed. One example may be witnessing the transitions from a bootloader to a kernel of the IPM 128, from the kernel to an operating system, and from the operating system to an application executed within said operating system. Another example may be witnessing individual events of loading and unloading applications within the operating system.

Hence, the IPM 128 is connected to the module 80 via a decoupling interface enclosed by the said at least one enclosing layer as described above. The cryptography module 140, the at least one tamper-detecting sensor 120, the zeroization support logic, and the decoupling interface are in turn all integrated as an anti-tamper system component (the module 80), and the decoupling interface is configured to selectively provide a physical and logical connection between the anti-tamper system component 80 in question and at least one discrete electronic component (the IPM 128) that is enclosed by at least one enclosing layer of said anti-tamper enclosure.

Furthermore, the module 80 may have at least one set of security properties which are subject to certification under a defined security standard independent of any electronic component 128 that has been connected to or disconnected from the module 80 through the said decoupling interface, thereby enabling independent design, fabrication and certification of the anti-tamper system component 80.

As is disclosed in WO 2016/099644 A1, a method of managing processing modules, such as modules 80 of the above described type, which modules 80 are available to remote clients over a computer network so as to provide confidentiality, non-repudiation, and authentication to the clients, comprises the following steps.

In a first step, at least one secure processing module 80 of the above described type is provided, comprising a processor, a memory, and a cryptography module interconnected inside an anti-tamper enclosure. The memory includes instructions that configure the processor to selectively load and run a plurality of logical layers so as to enable the secure processing module 80 to run at least one application software program. The application software program may hence be executed within the IPM 128 of the module 80.

In a subsequent step, the secure processing module 80 may connected to a computer network, thereby enabling it to communicate electrical signals over the computer network.

In a subsequent step, an electronic request for allocation of one or several secure processing modules 80 may be received over the said computer network.

In response thereto, at least one secure processing module 80 may be allocated, comprising at least reconfiguring each secure processing module 80 to be allocated and providing identifying information to the party from whom the electronic request was received.

Moreover, a party from whom the electronic request was received may be allowed to transmit, to the module 80 and in particular to the IPM 128, encrypted client software to any allocated secure processing module 80. Also, said party from whom the electronic request was received may be allowed to interface with client application software programs, wherein said client application software programs embody the encrypted client software after being decrypted and run on the allocated secure processing module 80 (and in particular on the IPM 128).

Furthermore, the said party from whom the electronic request was received may be allowed to transmit encrypted client data to the module 80 (and in particular to the IPM 128). Also, said party may be allowed to receive encrypted processed data embodying the encrypted client data after being decrypted, processed and encrypted on the allocated secure processing module 80 (IPM 128).

Such a method may also comprise a deployment step, for deploying said secure processing module 80 connected to said computer network to in turn allow the running of arbitrary client tasks on demand in a manner that secures sensitive data, code, and other information. In relation hereto, a secure communication channel may be established between the client device of said party and said secure processing module 80; the secure processing module 80 may receive an encrypted client package containing at least one of said client data and client software; and the said cryptography module the encrypted client package may be decrypted, thereby availing the decrypted client package to a processor of the module 80 (IPM 128) and further allowing said processor to load any client data in application software and run said client software.

For a more detailed discussion regarding such modules 80 and such methods, reference is made to WO 2016/137573 A1 and WO 2016/099644 A1.

In short, such modules 80 and such methods provide users with trusted secure execution environments (TEEs) with full data and code confidentiality and integrity, hosted inside tamper-proof secure hardware modules. Cloud users can transparently allocate and use the secure hardware modules on-demand as secure cloud instances using familiar cloud APIs. As a result, users may access and use secure trusted execution environments in a similar or identical fashion to standard cloud instances.

It is noted that WO 2016/137573 A1 and WO 2016/099644 A1, and the combination of the teachings in these two prior art documents, constitutes one example of how to provide a secure cloud service. Of course, other cloud service topologies also exist that provides security also from cloud service operators and insiders.

Overview

In this disclosure we will show how to offer users of a primary cloud service provider the ability to access, manage or consume resources and services of secondary cloud providers transparently, for example through the primary provider's control interfaces and APIs.

An example of secondary provider may be a highly secure cloud service provider (such as the above described Cipher-Rack solution) connected to a primary provider, e.g., a standard cloud service provider to offer highly-secure cloud service to the users of the primary provider.

This may be achieved by connecting one or more secure cloud services as secondary service providers to a primary service provider such as to offer users of the primary service provider the ability to manage and consume services of the secondary providers transparently, for example through the primary provider's control interfaces and APIs.

For example, upon receiving a request for allocation of a VEE from a client, the primary cloud service may choose to use a secondary service to allocate and return to the cloud a reference to a secure TEE instead. The client may then use the TEE to execute its workloads securely, possibly without needing to be aware of the fact that the TEE is being in fact transparently provided by a secondary provider.

The transparent nature of this delivery may range from full transparency (no change to the primary provider's APIs and control interfaces) to partial transparency (users may need to use possibly modified or different APIs and control interfaces).

Further, users may be able to continue to benefit from other features offered by the primary cloud service in conjunction with the secure cloud services.

In the above example, the client may want to allocate storage capacity provided by the primary cloud service and connect it to the TEE as it would normally do for standard VEEs.

Similarly, the client may want to associate certain networking parameters (e.g., IP addresses) or security policies (e.g., firewalling rules) with the TEE. The client may be able to do this easily using the primary provider's capabilities as it would normally do for standard VEEs.

This type of transparency may apply to all features and services of the primary cloud service including identities, authentication, access control, block storage, storage, instance metadata, load balancing, auto scaling, lifecycle management parameters, network addresses, connections etc.

In effect, one can generalize this idea to a general concept of "endowing" one service (e.g., the primary service) with properties (e.g., strong security) of another service (e.g., a secondary service).

One may also envision this endowment applying both ways. The endowment of properties may also be reciprocal. Roles of the endowed and endowing services may be reversed. For any cloud services A and B, certain properties of A may be endowed on B, while certain properties of B may be endowed on A.

One may also envision this endowment applying in a graph-like structure in which many service providers are fully or partially connected to each other and may transparently offer each other's services to their clients while maintaining the APIs, use and access models minimally changed or completely unchanged.

In such a deployment the notion of primary and secondary service provider may be relative and dependent on the per-service user-provider and provider-provider relationships.

Furthermore, multiple services offered by different providers may be organized arbitrarily (e.g., in a dependency graph) into a composite service, such that the delivery of the composite service to the user depends on the delivery of different services from one provider to the other in a dependency graph.

In brief, the invention relates to a method for the integrated use of a secondary cloud resource, provided by a secondary cloud service software function executed on secondary hardware, from a primary cloud service, provided by a primary cloud service software function executed on primary hardware which is remote to said secondary hardware, the method comprising in a provision step, providing an integration database as well as an integration software function, which integration software function is arranged to provide a primary integration interface and a secondary integration interface; in a resource request step, the integration software function receiving, via the said primary integration interface, an allocation request regarding a certain cloud resource, and the integration software function in response thereto identifying a set of secondary user data and requesting, via the secondary integration interface, said secondary cloud resource from the secondary cloud service, the secondary cloud resource request being performed using said secondary user data; in a resource allocation step, the secondary cloud service allocating the requested secondary cloud resource and providing, via the secondary integration interface, corresponding secondary cloud resource allocation information to the integration software function; in an information association step, the integration software function associating, in the integration database, said secondary cloud resource allocation information with said secondary cloud user data and also with a set of primary user data, identifying a primary cloud service user; and in a user authentication step, the integration software function authenticating the primary cloud service user access to said secondary cloud resource, by identifying in said integration database said secondary user data based upon said primary user data and authenticating, via said secondary integration interface, said secondary user data with the secondary cloud service.

FIGURES

In the following, the invention will be described in detail, with reference to exemplifying embodiments of the invention and to the enclosed drawings, wherein:

FIG. 1 is a schematic view of an integration adapter 10 according to the present invention;

FIG. 2 is an architectural view of communication channels that are established to facilitate a client 23 of a standard cloud service 21 to use a TEE offered by a secure cloud service 22.

FIG. 3 is an architectural view according to the invention that illustrates the identity, authentication, and access control aspects. A mapping between cloud accounts 291, 391, cloud users 292, 392, credentials 293, 393 and policies 294 are between primary and secondary cloud services is maintained in an identity store 12.

Figure 9:
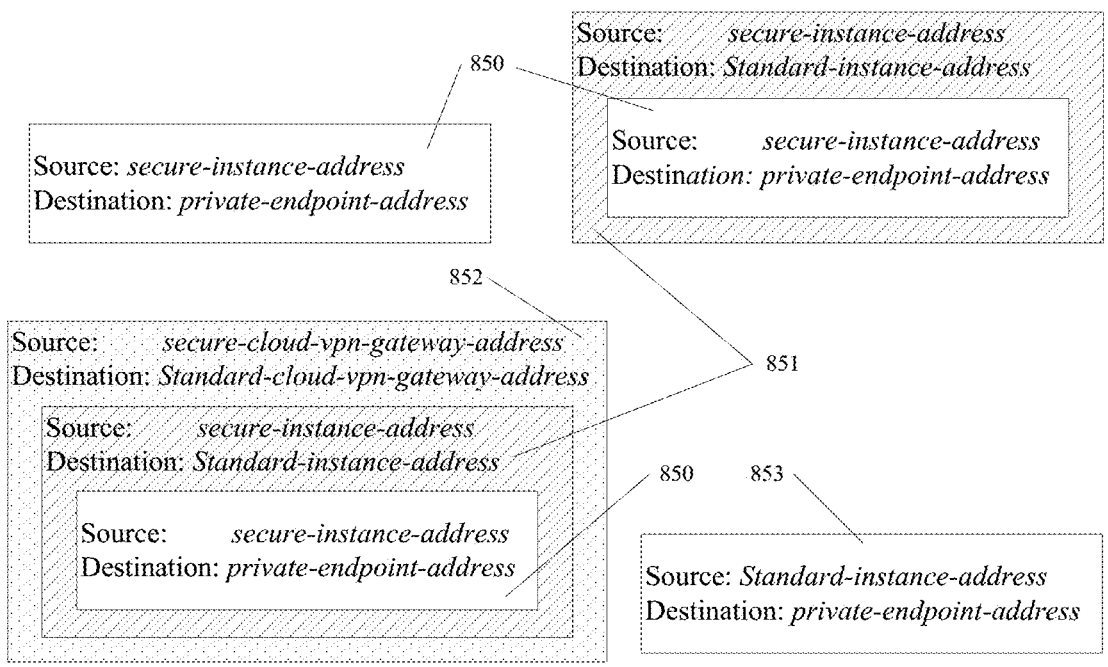
Figure 10:
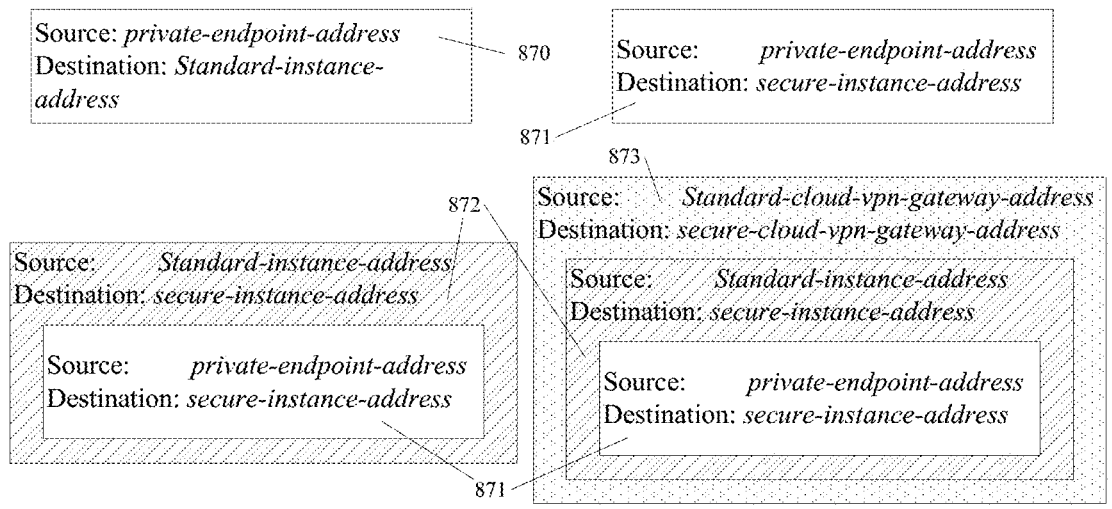

FIG. 9 and FIG. 10 outline packet processing in private endpoint endowments according to the invention.

Figure 11:
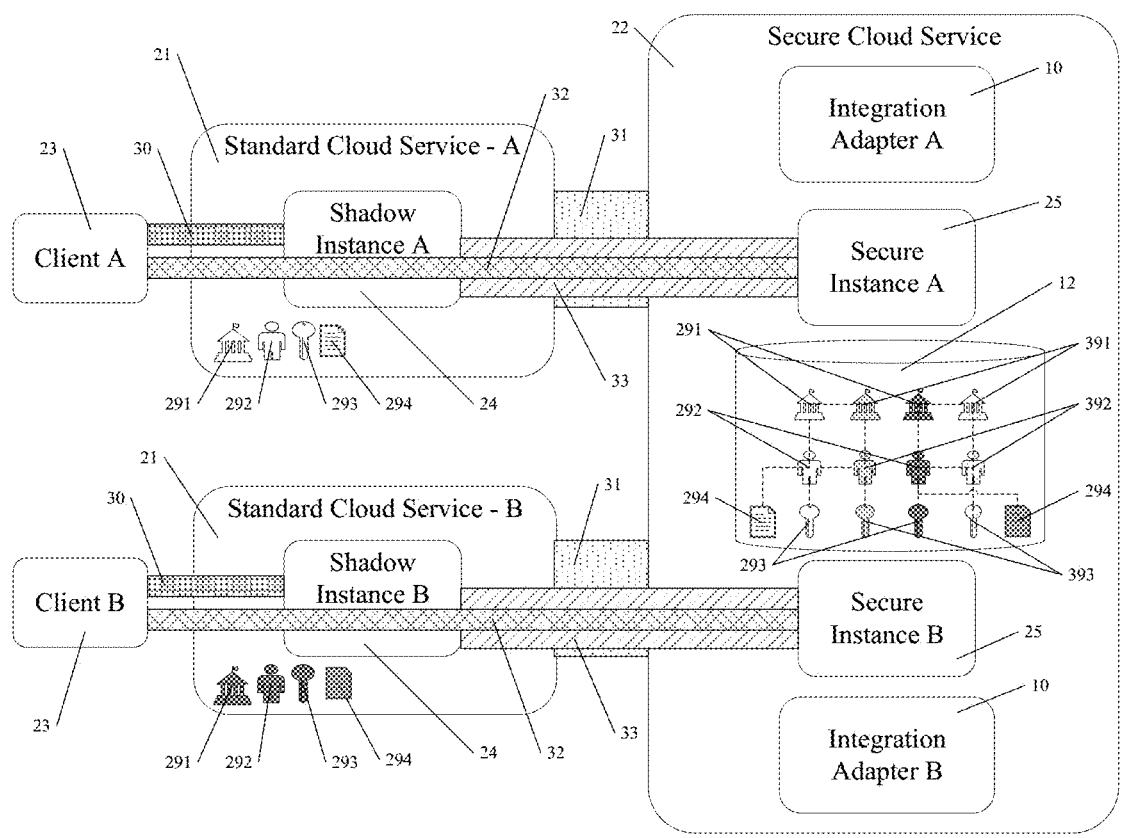
Figure 12:
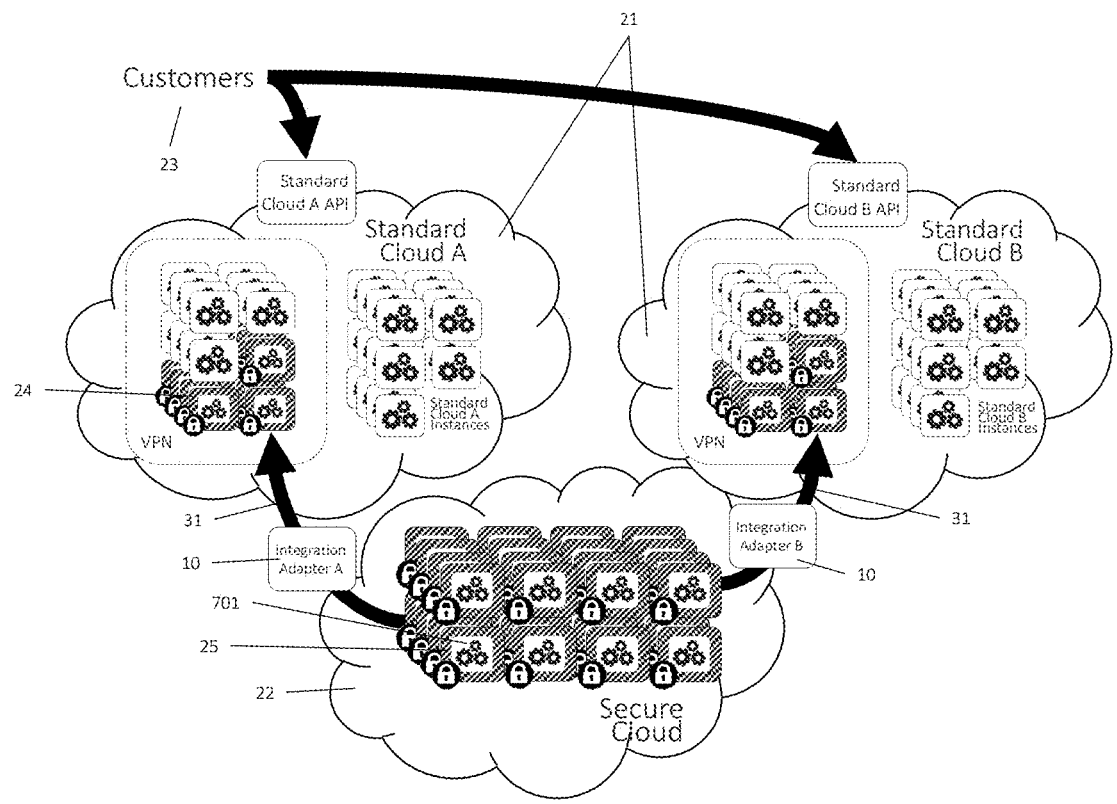

FIGS. 11 and 12 depict multi-cloud deployments comprising multiple primary cloud services.

Figure 13:
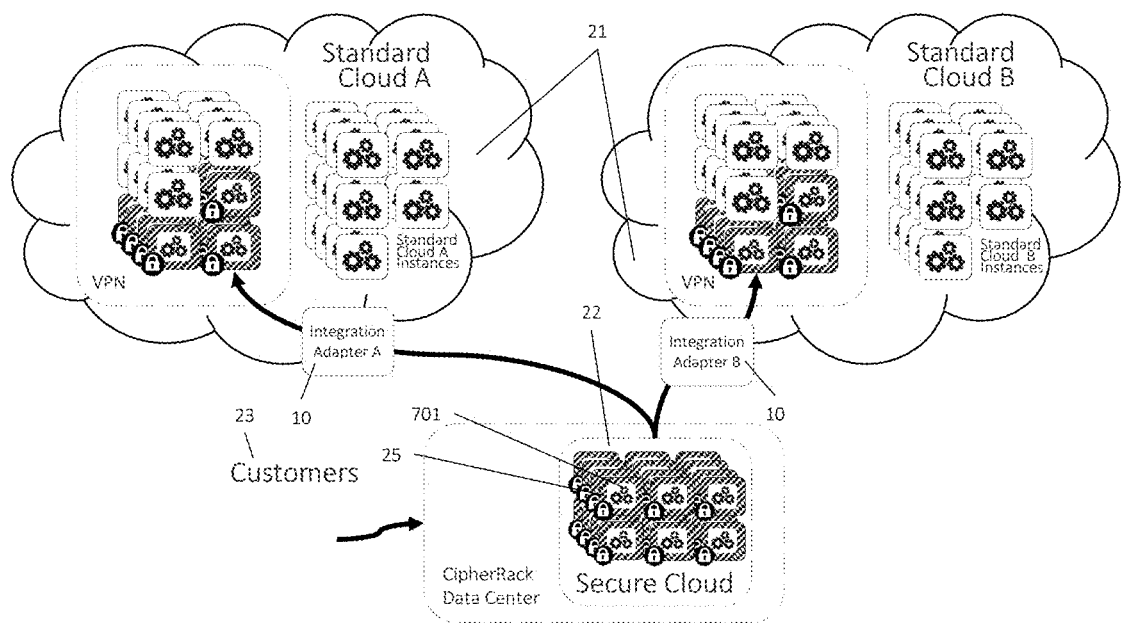

FIG. 13 illustrates the case where customers connect through or are located in data centers in closer network proximity to the secure cloud than the public clouds.

Figure 14:
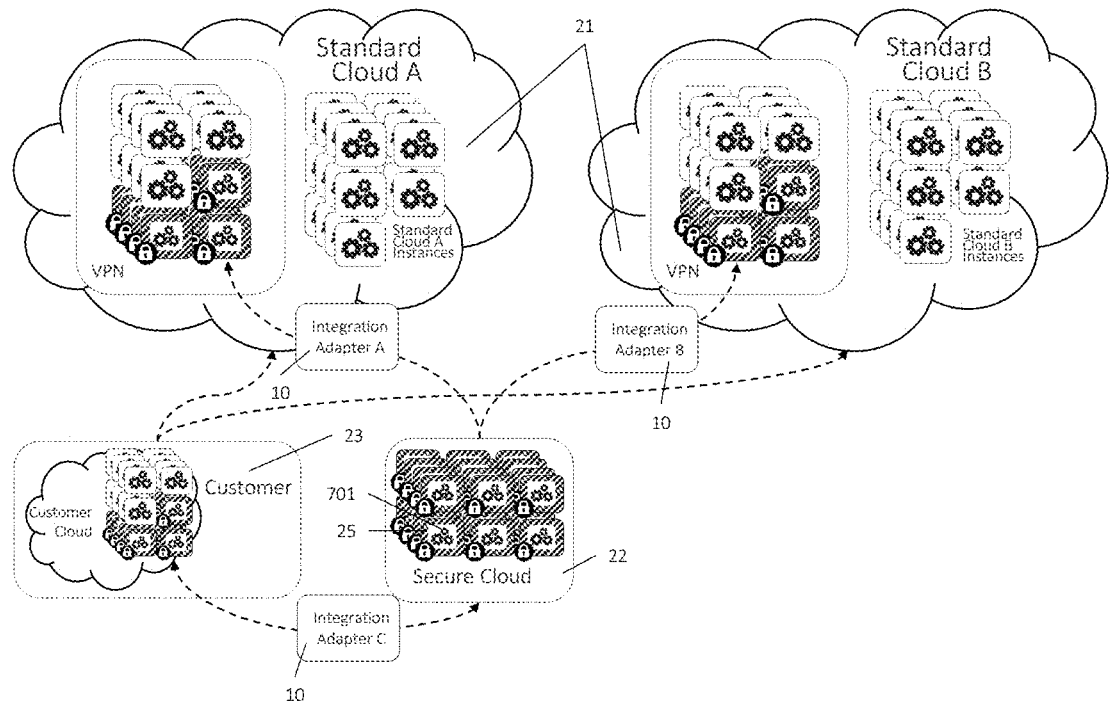

FIG. 14 illustrates a use case in which a customer may choose to connect her enterprise cloud as a primary cloud to benefit from a secure cloud service (such as provided via a CipherRack solution, as described above) as a secondary secure cloud in a hybrid configuration. Public clouds may also be connected in various ways to the resulting hybrid.

Figure 15:
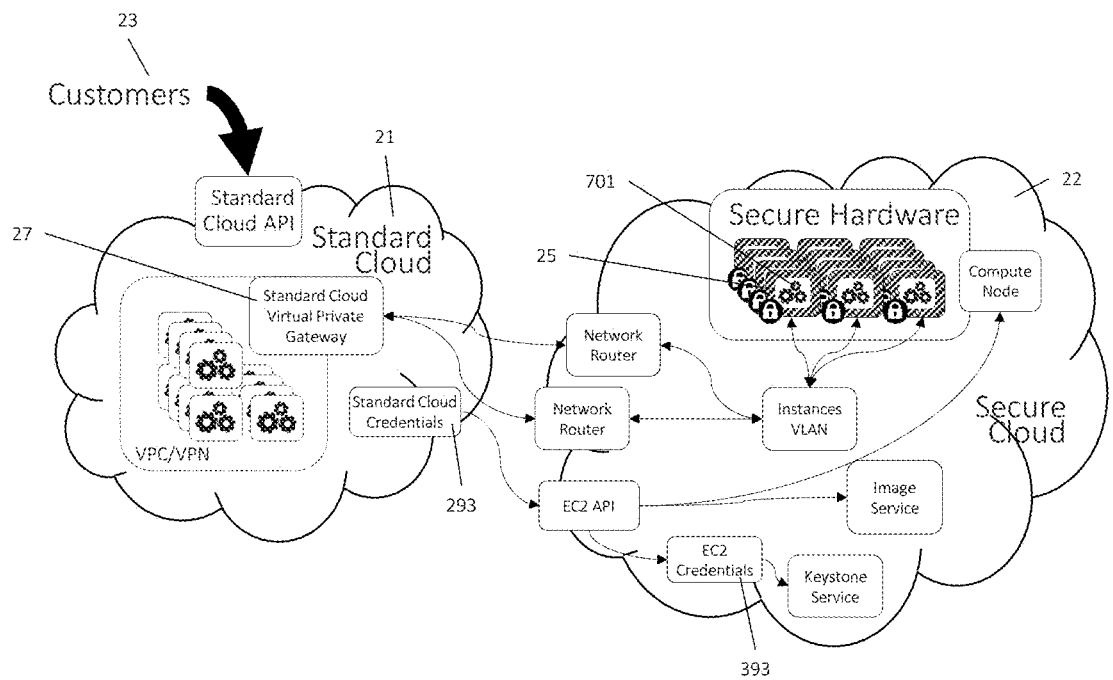

FIG. 15 illustrates a primary-secondary integration mechanism using mainly cloud-level VPN mechanisms in which clouds connect to each other first using a VPN and then instances from the secondary cloud may be connected directly to client networks in the primary cloud. This may be performed without the use of shadow instances (see below for a discussion on shadow instances according to the invention).

Figure 16:
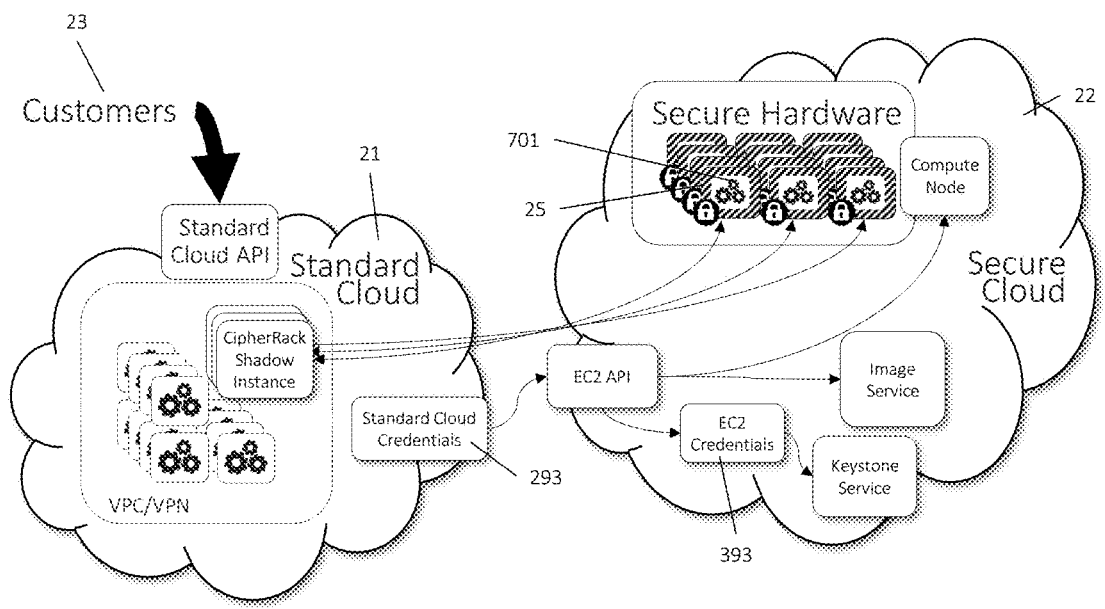

FIG. 16 illustrates an integration mechanism, using shadow instances (see below) running in the primary cloud connecting back to secure instances running in the secondary secure cloud (such as a CipherRack cloud, above).

Figure 17:
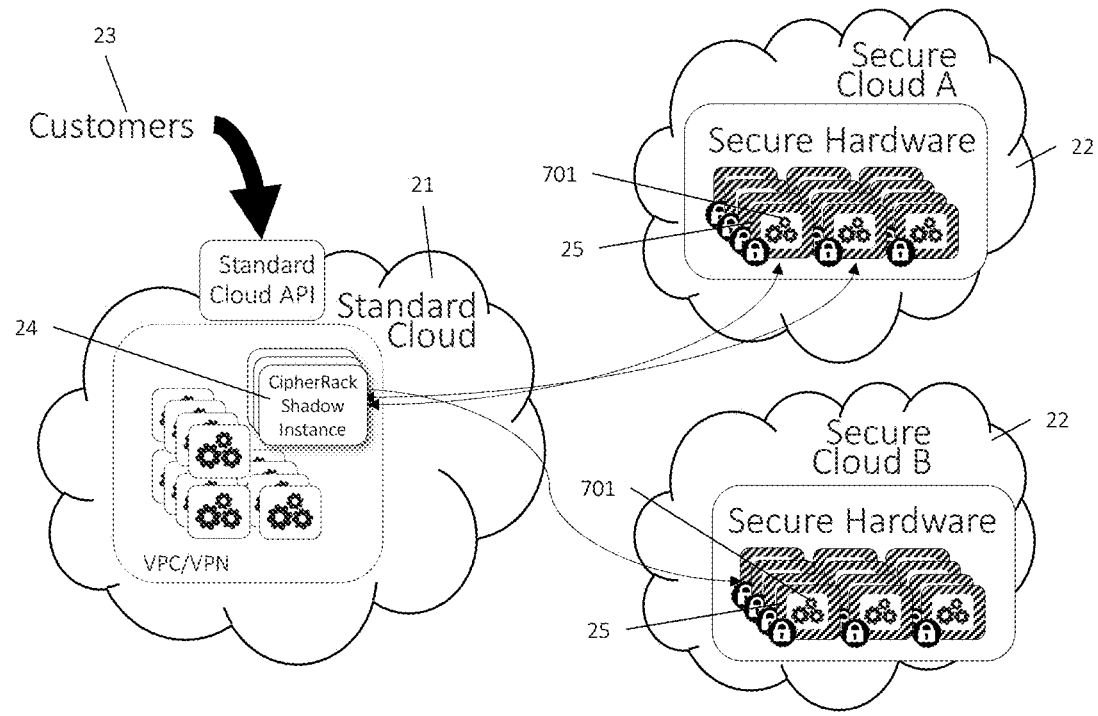

FIG. 17 illustrates the case of a primary cloud connected to multiple secondary clouds.

Figure 18:
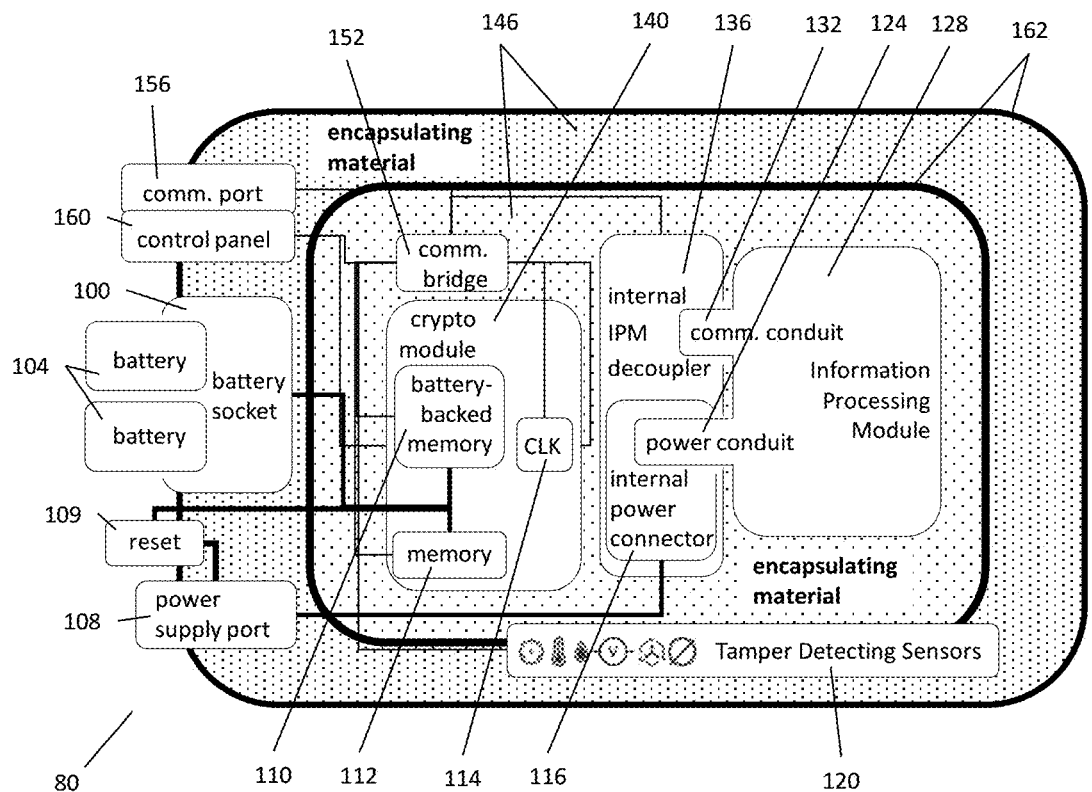

FIG. 18 is a schematic view of a prior art tamper-protected computer module, useful for use in a solution according to the invention.

Figure 19:
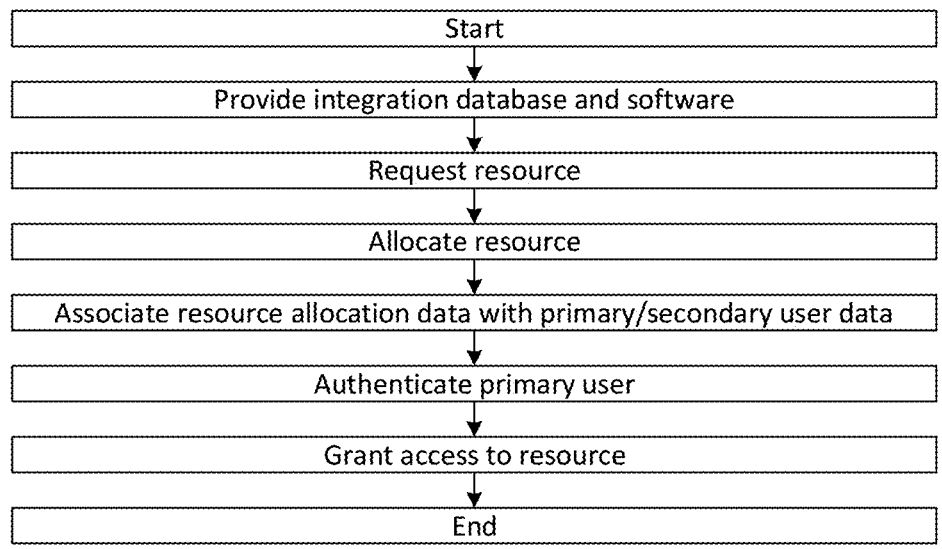

FIG. 19 is a flowchart illustrating a method according to the present invention.

Throughout the Figures, same reference numerals are used to denote same or corresponding parts.

DETAILED DESCRIPTION

In general, different cloud services may differ significantly from each other from a functional point of view. The differences may include authentication mechanisms, format of credentials, APIs, access control policy formats and enforcement, etc. Enabling clients of one cloud to transparently use the services of another cloud therefore needs to overcome such differences.

Figure 1:
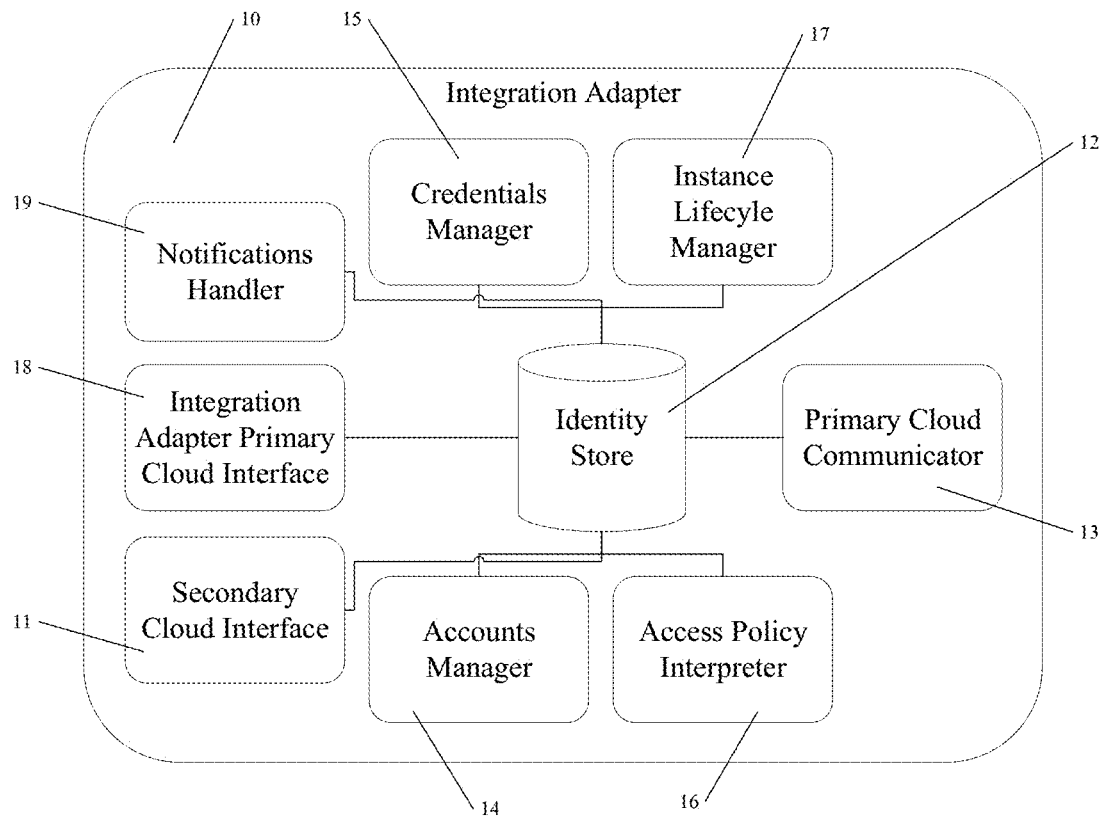

According to the present invention, a primary cloud may provide a secure integration adapter 10. The secure integration adapter 10 provides critical functionality needed to translate between one cloud and another. The terms "secure integration adapter", "integration adapter", and "adapter" are used interchangeably in this disclosure. Such an integration adapter 10 is illustrated in FIG. 1.

Figure 2:
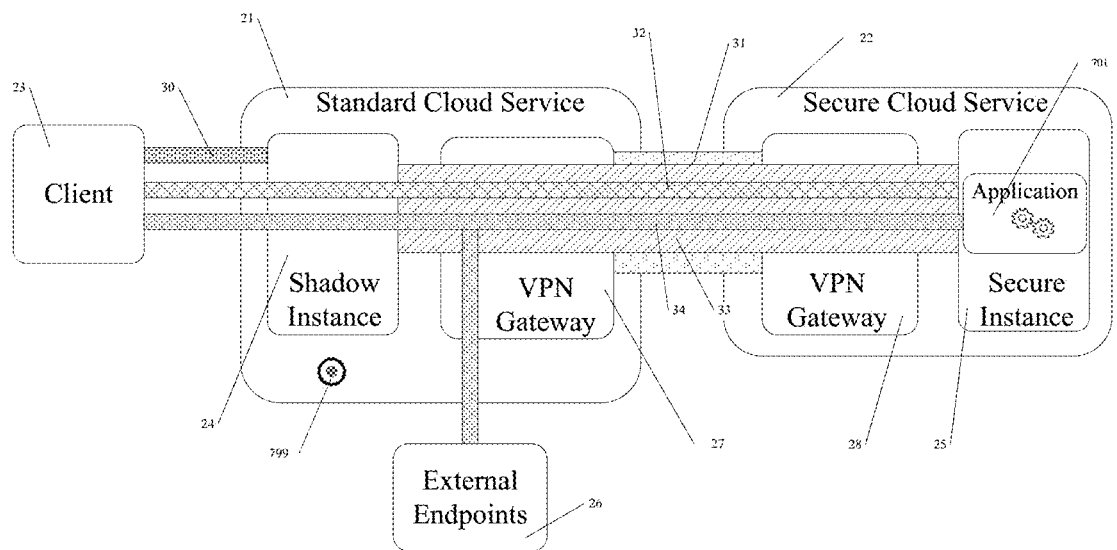
Figure 3:
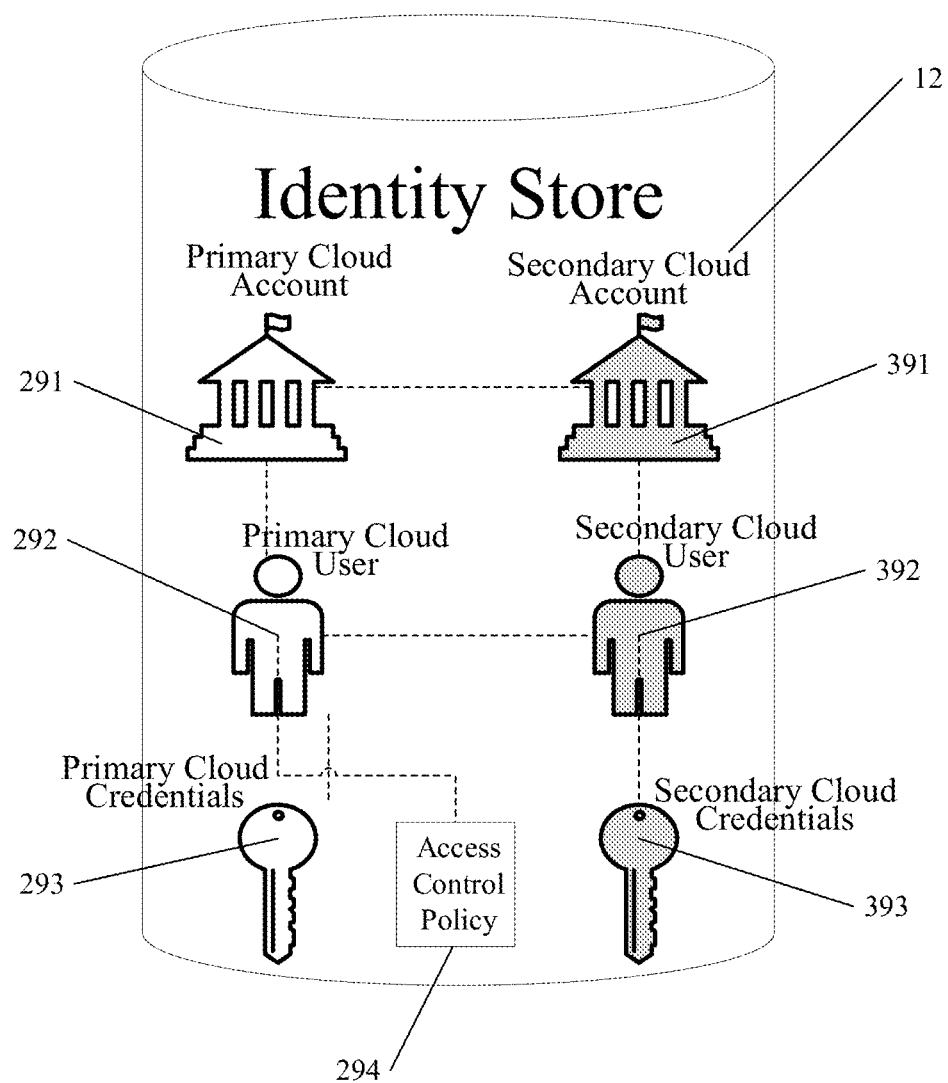

The integration adapter 10 may expose a certain number of interfaces to the users of a primary cloud 21 (see FIG. 2). For example, the integration adapter's 10 primary cloud interface 18 may be designed to be compatible with and accessible to the primary cloud's 21 standard APIs and client tools. Primary cloud 21 clients may connect to integration adapter 10 interfaces using standard or slightly modified tools.

FIG. 18 illustrates a method according to the present invention, which method is for the integrated use of a secondary cloud resource 22, provided by a secondary cloud service software function executed on secondary hardware, from a primary cloud service 21, provided by a primary cloud service software function executed on primary hardware which is remote to said secondary hardware.

In one embodiment, that the said hardware is "remote" may mean that the two pieces of hardware are not located in the same physical location, such as that they are at least located in different buildings. Of significance, however, is that they are separated by a computer network, such as the public internet. Communications between the remote set of hardware may take place via VPN tunnelling, as will be described further below.

In another embodiment, "remote" may also mean that the two pieces of hardware may be located in the same physical location, or even within the same server chassis or rack enclosure, but may be logically separated, e.g., by using different software or logical network connections. It is understood that the present invention relates to such physical and/or logical remoteness with respect to the relationship between the first and second hardware. For instance, a first cloud may be collocated with a second cloud, or arranged in geographically different facilities. However, in a particularly envisioned embodiment there is geographical separation between first and second hardware.

In an initial step, the method starts.

In a subsequent provision step, an integration database as well as an integration software function are provided. The integration database may be any suitable database, such as a relational database appropriately accessible to or integrated as a part of the integration adapter 10. In FIG. 1, the identity store 17 is an example of such an integration database. The integration software function is arranged to provide a primary integration interface and a secondary integration interface. The integration software function is preferably executed on hardware of the integration adapter 10, or alternatively in a VEE allocated specifically for running the said software function. In the former case, the integration adapter 10 may be provided as a standalone hardware device, with one or several physical interfaces for communication with external users or clients 23, the primary cloud service 21 and the secondary cloud service 22. In the latter case, the corresponding interfaces may be purely electronically provided, and the VEE in question may be allocated within any appropriate environment, including the primary cloud, the secondary cloud or an external cloud (not shown in the Figures).

The primary integration interface is arranged to provide a digital communication interface between the integration adapter 10 and one or several primary cloud services 21 that make use of the integration adapter 10, and may comprise, for instance, a primary cloud communicator 13. Correspondingly, the secondary integration interface is arranged to provide a digital communication interface between the integration adapter 10 and one or several secondary cloud services 21 that make use of the integration adapter 10, and may comprise, for instance, a secondary cloud interface 11.

In a subsequent resource request step, the integration software function receives, via the said primary integration interface, an allocation request regarding a certain cloud resource, which may be the above mentioned secondary cloud resource. The request may originate from an external user or client 23, but may also originate from a cloud-internal requestor, such as a shadow instance 24, such as will be exemplified below. In response thereto, the integration software function is arranged to automatically identify a set of secondary user data, and then to request, via the said secondary integration interface, said secondary cloud resource from the secondary cloud service 22. The secondary cloud resource request is performed using said identified secondary user data.

As described above, the secondary cloud resource may be selected from a set of several different resource types, including networking, storage, auto-provisioning, and managed applications.

The secondary user data may identify a registered user of the secondary cloud service 22, including sufficient data so as to access the secondary cloud service 22 for use of the resource in question, for instance via a login. This will be detailed below.

In a subsequent resource allocation step, the secondary cloud service may then automatically allocate the requested secondary cloud resource and may provide, via the secondary integration interface, corresponding secondary cloud resource allocation information to the integration software function. Such cloud resource allocation information may comprise information which is sufficient for the requesting party to exploit or use the requested and allocated resource. For instance, such information may comprise an internet address and any required credentials, such as username/password pairs or cryptographic keys.

In a subsequent information association step, the integration software function is arranged to automatically associate, in the said integration database, said secondary cloud resource allocation information with said secondary cloud user data and also with a set of primary user data, identifying a primary cloud service 21 user.

The primary user data may be retrieved from said internal or external user or client 23 performing the request in the first place, and may identify a registered user of the primary cloud service 21, including sufficient data so as to be able to log into the primary cloud service 21.

In a subsequent user authentication step, which may take place in direct connection to the information association step or at a later point, the integration software function is arranged to automatically authenticate the primary cloud service 21 user access to said secondary cloud resource, by identifying in said integration database said secondary user data based upon said primary user data and authenticating, via said secondary integration interface, said secondary user data with the secondary cloud service 22.

In some embodiments, the said secondary user data may comprise user and/or account credentials for the secondary user in question. Then, the said resource request step may comprise the integration software function requesting, via the said secondary integration interface, the creation of the secondary user from the secondary cloud service 22. In other words, the secondary user to the secondary cloud service 22 may not exist prior to the point in time when the secondary cloud resource is to be requested and allocated, but be created on-the-fly in connection thereto. It is hence not necessary for a secondary user to be pre-existing with the secondary cloud service 22 before the solution according to the present invention is applied.

Using such an integration adapter 10 with such an integration adapter software function, secondary cloud resources can be made available from within or via primary cloud services in a manner offering arbitrary transparency and flexibility, if desired using standard interfaces and without requiring complex redesign of existing cloud infrastructures. The solution may be provided in a fully modular fashion, with minimal impact to existing installations.

In some embodiments, the said provided secondary cloud resource may be an execution environment (such as a VEE) in which a user-specific application 701 is allowed to be loaded and executed. This is illustrated in FIG. 2.

In the following, the present invention will be presented in even further detail.

In an important embodiment, the said secondary cloud service software function is executed on physically tamper-proof hardware, such as of the type described above in connection to CipherRack and ENFORCER Blade. In other words, the above-referenced secondary hardware is physically tamper-proof hardware. Hence, the secondary cloud service 22 is in this case arranged to provide resources at a different, and preferably higher, security level than what is the case for the primary cloud service 21. Alternatively, it may be the very resource provided by the secondary cloud service 22 (as opposed to the secondary cloud service 22 as a whole) which is provided at said higher security level, irrespectively of a security level provided by other parts of the secondary cloud service 22. For instance, the secondary cloud service 22 may comprise more secure resources as well as less secure resources.

In some embodiments, the integration software function is in fact an adapter function, arranged to translate primary cloud service 21 API calls to corresponding secondary cloud service 22 API calls and vice versa, using said interfaces, which primary 21 and secondary 22 cloud service API calls are formatted differently and may have different semantics. To this extent, the integration software function comprises a translation part, arranged to pass the information in such API calls on, using the differently formatted API calls required for forwarding of the information in question. Such a translation part may also be arranged to perform logic operations such as will be exemplified below.

In particular, the primary integration interface may be compatible with a primary cloud service 21 API. The said secondary integration interface may also be compatible with a secondary cloud service 22 API. Then, the integration software function may be arranged to translate API calls between the primary cloud service 21 API and the secondary cloud service 22 API.

In one important aspect of the present invention, already mentioned above, the integration software function is executed as a part of the secondary cloud service 22. The integration software function may be provided by an operator of the secondary cloud service 22, as an integrated virtual or physical part of the secondary cloud service 22; or it may be provided by an external user or client 23, such as installed as an image on a VEE the allocation is requested by such an external user or client 23. This way, a secondary cloud service 22 operator or a third party user may provide a way for the third party user, or anybody, to access the secondary cloud resource from within the primary cloud. Once the integration adapter 10 has been put into place, a software function running within the primary cloud can access the secondary cloud resource by suitable calls to the primary cloud interface of the integration adapter 10 in question.

In the following, for clarity and efficiency, the disclosure focusses on offering the services of a secure secondary cloud to the clients of a standard primary provider. However, it is noted that the systems and mechanisms described herein are applicable in general across any cloud services, not necessarily security-centric. In the case of the integration between a secure cloud service 22, and a standard cloud service 21, the integration adapter 10 may be considered part of the secure cloud service 22.

What is said about the integration adaptor 10 is equally applicable to the said integration software function, and vice versa.

Identities. In one embodiment, an integration adapter 10 maintains a mapping between user accounts in an insecure cloud (identified by said primary user data) and a secure cloud service (identified by said secondary user data), respectively. The mapping may be created and maintained as part of an "account linking" process. Account linking may ensure that a valid primary cloud account user is allowed to transparently access the services offered by a secondary cloud. In one embodiment, account linking may be done via the following process:

1. A user 292 belonging to an account 291 in a standard cloud service 21 obtains valid credentials 293 from the standard cloud service 21.
2. The user 292 then sends an "account-link" request to the integration adapter's 10 primary cloud interface 18. The request may contain information about the account 291, the user 292, and the credentials 293.
3. The integration adapter's 10 primary cloud communicator 13 may then contact the primary cloud service 21 using the credentials 293 to verify that the account 291 and user 292 information are valid. Validity may include verifying the existence of the account 291 and the user 292 in the primary cloud service 21. Validation may comprise other primary insecure cloud-specific method.
4. If the account 291 and user 292 are valid, the integration adapter's 10 primary cloud communicator 13 may retrieve the access control policy 294 attached to the user 292 in the primary cloud service 21.
5. The integration adapter's 10 access policy interpreter 16 may interpret the access control policy 294 to determine if the user 292 has permission to "link" the account 291 with the secondary cloud service 22.
6. If the account 291 and the user 292 are valid, and the user 292 has account link permission as per the access control policy 294, the integration adapter's 10 accounts manager 14 creates a corresponding account 391 in the secondary cloud service 22.
7. The accounts manager 14 may then record (persist) the correspondence link between primary cloud account 291 and secondary cloud account 391 in the integration adapter's 10 identity store 12.

Account linking ensures that resources allocated or used in the secure secondary cloud service 22 can be attributed to account 291 in the standard primary cloud service 21.

In one embodiment, the adapter 10 may maintain mappings between credentials in a primary standard cloud service 21 and one or more secondary secure cloud services 22. The mapping is created and maintained as part of a "credentials linking" process—described in the following.

1. A user 292 belonging to an account 291 in a primary standard cloud service 21 obtains valid credentials 293 from the primary standard cloud service 21.
2. The user 292 then sends a "credentials-link" request to the integration adapter's 10 primary cloud interface 18. The request may contain information about the account 291, the user 292, and the credentials 293.
3. The integration adapter's 10 primary cloud communicator 13 may then contact the primary standard cloud service 21 using the credentials 293 to verify that the account 291 and the user 292 are valid. Validity may include verifying the existence of the account 291 and the user 292 in the standard cloud service 21. Validation may comprise other cloud-specific method.
4. If the account 291 and the user 292 are valid, the primary cloud communicator 13 may retrieve the access control policy 294 attached to user 292 in the standard cloud service 21.
5. The accounts manager 14 may then verify that the primary cloud account 291 is linked to a corresponding secondary cloud account 391 in the identity store 12.
6. If the account 291 and the user 292 are valid, and account linking is confirmed, the accounts manager 14 may create a user 392 in the secondary secure cloud service 22.
7. The accounts manager 14 may record (persist) in the integration adapter's 10 identity store 12, the link between the primary cloud user 292 and secondary cloud user 392.
8. The credentials manager 15 may record (persist) in the integration adapter's 10 identity store 12 the credentials 293 and a correspondence link between user 292 and credentials 293.

Different cloud services may use different credential formats. For example, a primary cloud service may use an access key and secret key pair while a secondary cloud service may use tokens. If the credentials format differs between the standard cloud service 21 and the secure cloud service 22, the credentials manager 15 in step 8 above may generate new secure cloud-specific credentials 393 and may store a correspondence link between the user 392 and her credentials 393.

The account link and credentials link processes may be combined into a single process. Once credentials are linked, resources allocated or used in the secondary cloud service 22 may be correctly attributed to the identity of the corresponding primary cloud service 21 user 292.

Hence, the above mentioned primary user data may comprise user and/or account credentials for the primary cloud service user, and the primary user data may be provided to the integration software function via the said primary integration interface.

Furthermore as detailed above, the said user authentication step may comprise the integration software function identifying a user access policy pertaining to the primary cloud service user, and that the integration software function applies the said user access policy to said authentication with the secondary cloud service.

Authentication and credentials. A user 292 of a primary insecure cloud service 21 may need to authenticate (potentially transparently) to a secondary secure cloud service 22 using credentials that are generated and issued by the primary standard cloud service 21. In one embodiment, authentication may involve the following:

1. A user 292 belonging to an account 291 in a primary standard cloud service 21 may obtain valid credentials 293 from the primary standard cloud service 21.
2. The user 292 may then execute the credentials link process described above. As a result, the integration adapter's 10 identity store 12 may contain a persistent link between the user 292 and her credentials 293.
3. At a later time, the user 292 may submit a request to the integration adapter's 10 primary cloud interface 18.
4. The integration adapter's 10 primary cloud interface 18 may then locate the credentials 293 linked to user 292 in the identity store 12.
5. The integration adapter's 10 primary cloud interface 18 then authenticates the user 292 to the secondary secure cloud service 22 using her primary cloud credentials 293.

In one embodiment, steps 1 to 5 may be performed for each interaction between a primary cloud user 292 and a secondary secure cloud service 22.

Alternately, step 2 above may be performed only once for multiple iterations of steps 3 to 5.

Access Control. The secondary secure cloud service 22 may enforce access control on a user 292 based on an access control policy 294 associated with the primary standard cloud service 21. In one embodiment, this may proceed as follows:

1. A user 292 belonging to an account 291 in a standard cloud service 21 may obtain valid credentials 293 from the standard cloud service 21.
2. The user 292 may then execute the credentials link process described above; as a result, the identity store 12 may have an access control policy 294 associated with the standard cloud service 21.
3. At a later time, the user 292 may submit a request to the integration adapter's primary cloud interface 18.
4. The integration adapter's primary cloud interface 18 may then authenticate the user 292 as described above under "authentication and credentials".
5. The integration adapter's primary cloud interface 18 may then locate the access control policy for the user 292 in the identity store 12.
6. The integration adapter's 10 access policy interpreter 16 may interpret the access control policy to verify whether the user 292 has access to the requested resource or action.

In one embodiment, the access control policy 294 associated with the standard cloud service 21 may be augmented with statements granting or denying access to specific resources in the secure cloud service 22. The access policy interpreter 16 may be enhanced to interpret such augmented policies.

Within the standard cloud service 21, credentials for a user 292 may be invalidated or access control policies 294 may change from time-to-time based on organizational requirements. Access control mechanisms may adapt to such changes in authentication and authorization parameters.

Therefore, the method of the invention may further comprise an information updating step in which the integration software function, via the primary integration interface, verifies the accuracy of the primary user and/or account credentials, and, if said credentials are accurate, updates information pertaining to said user access policy in the integration database.

Hence, in one embodiment the integration adapter may periodically perform the following update actions for each linked user 292.

1. The integration adapter's 10 credentials manager 15 may load the standard cloud credentials 293 and standard cloud account 291 of the standard cloud user 292 from the identity store 12.
2. The integration adapter's 10 primary cloud communicator 13 may then contact the primary standard cloud service using the standard cloud credentials 293 and user 292.
3. If either the standard cloud account 291 or user 292 are unknown, invalid, or otherwise unapproved in the standard cloud service 21, the integration adapter's 10 accounts manager 14 may remove the link between the primary standard cloud user 292 and the secondary cloud user 392 from the identity store 12.
4. If the standard cloud credentials 293 are invalid in the standard cloud service 21, the credentials manager 15 may remove the link between the standard cloud user 292 and the standard cloud credentials 293 from the identity store 12.
5. If the standard cloud account 291, user 292 and credentials 293 are all valid, the primary cloud communicator 13 may retrieve the access control policy 294 attached to the standard cloud user 292 in the standard cloud service 21.
6. The access policy interpreter 16 may then record (persist) the access control policy 294 for user 292 in the identity store 12.

Each time the above process is repeated, the identity store 12 may be updated with the latest authentication and authorization data from the standard cloud service 21.

In one embodiment, the integration adapter's 10 notifications handler 19 may subscribe to notifications from the standard cloud service 21. Notifications may include information about the standard cloud user 292 whose authentication or authorization (access control) related parameters have changed in the standard cloud service 21.

On receipt of such a notification, the event handler may trigger the following process.

1. The integration adapter's 10 notifications handler 19 may extract the information about the standard cloud account 291 and user 292 from the notification.
2. The integration adapter's 10 accounts manager 14 may verify that the account 291 is linked to an account 391 in the identity store 12. Note that, in the update procedure described previously, the check performed here is implicitly made in Step 1 where only previously linked users are considered for update.

3. The periodic process described above may then be performed to update the authentication and authorization information for the standard cloud user 292 in the secure cloud service 22. The notification handler may choose not to trigger the update process if the user 292 is not linked to a user 392 in the identity store.

In an important aspect of the present invention, the inventive method further comprises a shadow instance initiation step, which may then be performed before the above described resource request step.

Figure 4:
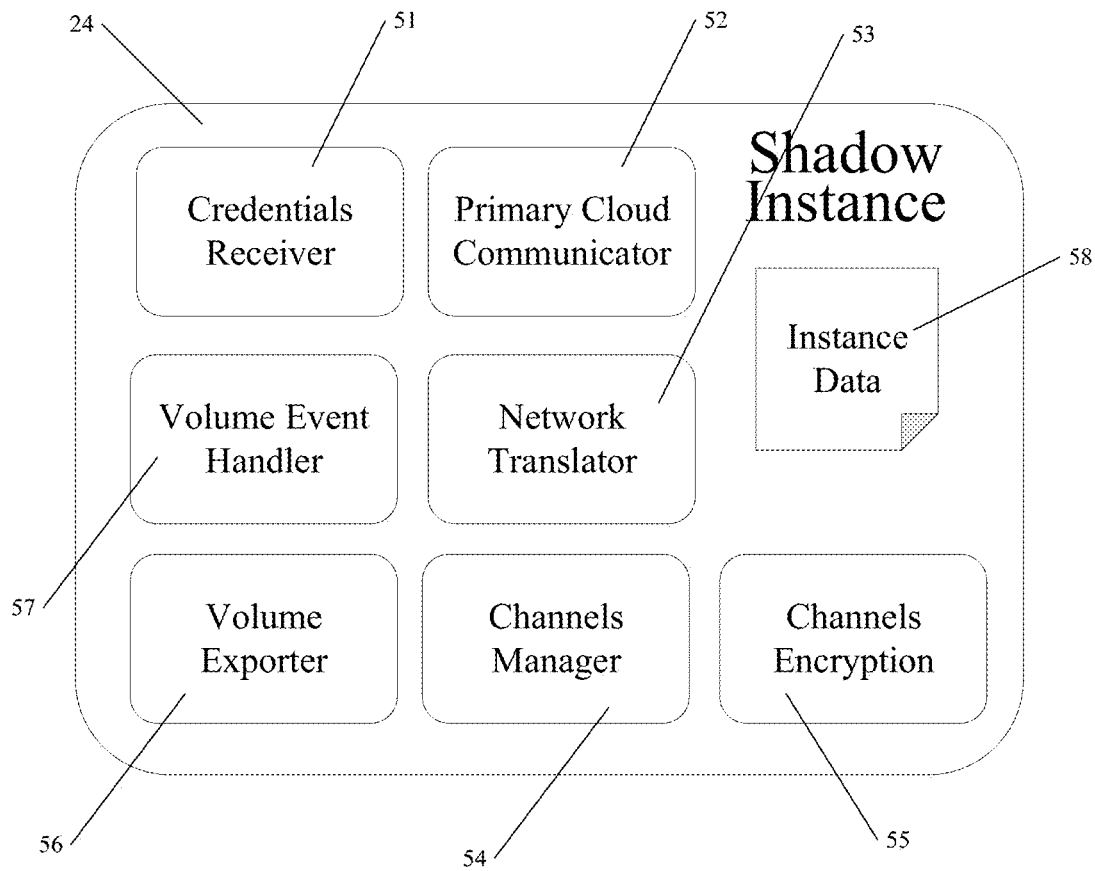
FIG. 4 is an architectural view of the shadow instance, one of the several mechanisms and components allowing delivering a secondary cloud's services to a primary cloud's clients.
Figure 5:
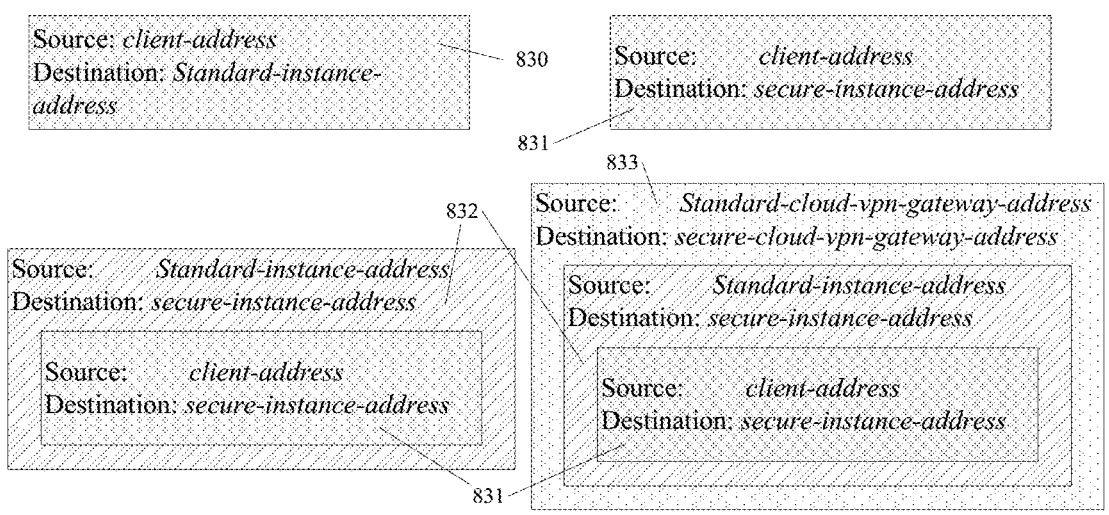
FIG. 5 and FIG. 6 illustrate certain network packet encapsulation formats deployed in the delivery of services from secondary to primary providers.
Figure 6:
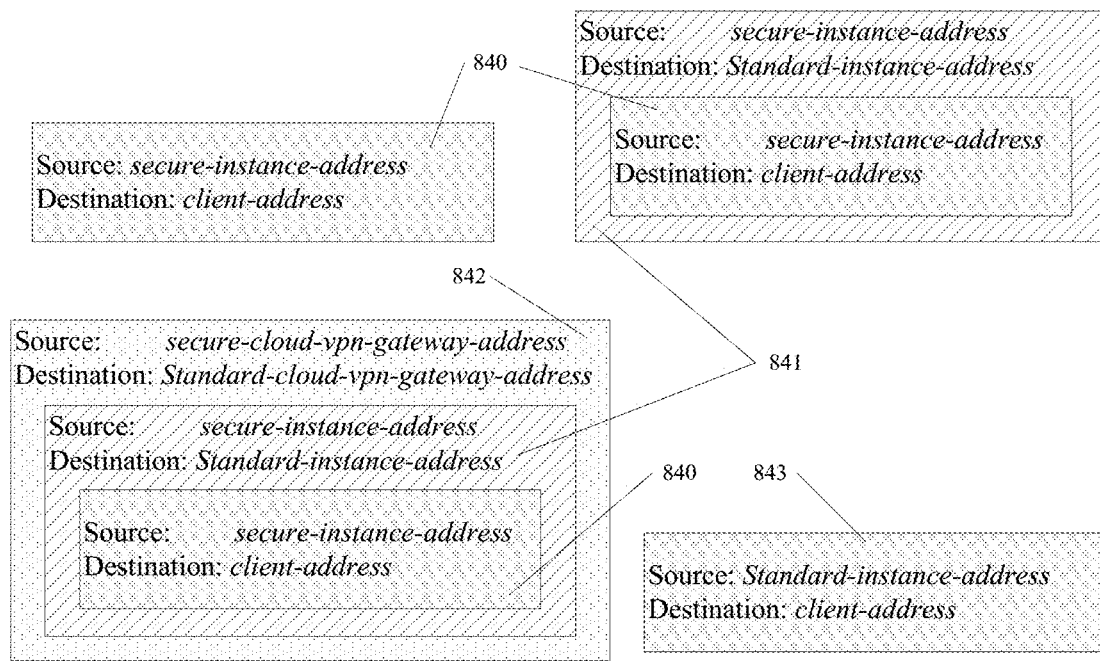

In this shadow instance initiation step, a shadow instance 24 is initiated as a shadow software function executing in an execution environment of said primary cloud service 21 and providing or constituting a primary cloud resource corresponding to said secondary cloud resource. Such a shadow instance 24 is presented in more detail in FIG. 4. It is noted that the primary cloud resource is a resource provided, or seemingly (from an external perspective) provided by the primary cloud service 21, and not by the secondary cloud service 22.

Furthermore according to this aspect, in the above described resource request step, the shadow instance 24 may be arranged to send the allocation request described above in relation to this step. Hence, instead of the external client or user 23 initiating this allocation request, the shadow instance 24 may act as a proxy for an external client or user 23 performing said request. Hence, the shadow instance 24 may take the role otherwise played by the external client or user 23.

Furthermore according to this aspect, in the above described information association step, the primary user data may identify the shadow instance 24 as the primary cloud service user.

Furthermore according to this aspect, the method may comprise a resource use step, in which the shadow instance 24 receives a use request for the said primary cloud resource of the shadow instance 24, from an external client or user 23. As a result of such a received use request, the shadow instance 24 is arranged to in turn initiate a corresponding use request (for a corresponding resource) to the secondary cloud service 22 for the secondary cloud resource (which is hence the corresponding resource in question). That the resource is a "corresponding resource" means that the secondary cloud resource being provided to the external client or user 23 via the shadow instance 24 functionally corresponds, or may even be identical, to the primary cloud resource requested from the shadow instance 24. It may even be so that the provision of the secondary cloud resource via the shadow instance 24 is completely transparent in the sense that the external user or client 23 cannot tell that the cloud resource is in fact not provided by the primary cloud service 21, but by the secondary cloud service 22. Various types of cloud resources, such as storage, VEEs or calculation services, or combinations thereof, as described above, may constitute said cloud service provided via the shadow instance 24.

In particular, in some embodiments, in the said shadow instance initiation step, the said primary user data may be provided by the external user or client 23 to the shadow instance 24.

In the following, the mechanisms relevant to the shadow instance 24 according to the present invention will be detailed, firstly in relation to aspects related to instance lifecycle.

Such lifecycle management is particularly advantageous in embodiments of the present invention wherein, in the above described shadow instance initiation step, the shadow software function is provided by an external client or user 23 to the primary cloud service 21, such as in the form of an image. Granted, such provision of the shadow software function may be the case even without lifecycle management. It provides for a very simple and uncomplicated way for any external client or user 23 to quickly provide a shadow instance in the existing primary cloud, for thereafter being able to be provided with secure cloud resources from the secondary cloud service 22. With the use of the integration adapter 10, such a client or user 23 may even be unaware of these secure cloud resources being provided, by the shadow instance 24, from the secondary cloud service 22. For instance, the shadow instance 24 image may be provided to the external client or user 23 by an operator of the secondary cloud service 22.

Turning specifically to the question of lifecycle management, the inventive method may further comprise that, in the above described information association step, the integration software function associates in the integration database the shadow instance 24 with the secondary cloud resource. Then, the inventive method may furthermore comprise a shadow instance 24 state change detecting step, in which a state change of the shadow instance 24 is detected by the integration software function. Then, the integration software function may, in reaction to such detection, and via the secondary integration interface, initiate a corresponding state to a corresponding instance providing the secondary cloud resource.

In the following, this will be described in closer detail.

Instance lifecycle. When a client makes use of a primary standard cloud shadow instance 24 to access services provided in fact by a secondary secure cloud TEE instance 25, it may be desirable that lifecycle events (e.g., allocation, management and termination events.) that apply to the primary instance 24 propagate meaningfully to the secondary cloud instance 25. This may be achieved as follows.

1. The primary standard cloud user 292 may allocate a shadow instance 24 in the standard cloud service 21. The standard cloud service 21 may mandate successful authentication and authorization prior to allocation as discussed above.
2. The shadow instance 24 may start and boot.
3. The shadow instance 24 may contact the integration adapter's 10 secondary cloud interface 11 to requesting an allocation of a secure cloud instance 25.
4. The integration adapter's 10 instance lifecycle manager 17 may allocate a secure cloud instance 25.
5. The instance lifecycle manager 17 may record in the identity store 12 a link between the shadow instance 24 and the secure instance 25.

In one embodiment, authentication and credentials management and instance lifecycle endowment may be used in conjunction. In this case, in step 3 above, the secondary cloud interface 11 may require the shadow instance 24 to authenticate. Authentication information may be supplied to the shadow instance 24 by the user 292 at launch time. Alternatively, if the standard cloud service supports instance profiling, the shadow instance 24 may be automatically supplied with temporary credentials that may be used to authenticate to the secondary cloud interface 11 on behalf of the user 292 that launched the shadow instance 24.

In one embodiment, a shadow instance may be equipped with a primary cloud communicator 52. The primary cloud communicator 52 interfaces (or communicates) with the integration adapter's 10 primary cloud interface 18. A primary cloud communicator 52 may be implemented as part of the shadow instance VEE image. Multiple shadow instances 24 may be allocated using the same VEE image.

Lifecycle states may constantly change. If the lifecycle state of a shadow instance 24 changes in the standard cloud service 21, the state of one or more VEEs in the secure cloud service 22 may be changed accordingly. For example, a "snapshot" and "shutdown" sequence of actions applied to the shadow instance 24 may result in an additional "snapshot" and "shutdown" sequence of actions applied to the secure instance 25.

In one embodiment, to sync instance states between a standard cloud service 21 and a secure cloud service 22, an integration manager's 10 instance lifecycle manager 17 may periodically perform the following actions for each allocated secure instance 25 in the secure cloud service 22.

1. The instance lifecycle manager 17 may locate the shadow instance 24 linked with the secure instance 25 from the identity store 12.
2. The instance lifecycle manager 17 may then locate the user 392 that allocated the secure instance 25.
3. The accounts manager 14 may locate the primary standard cloud user 292 linked to the secondary cloud user 392 from the identity store 12.
4. The credentials manager 15 may read the primary standard cloud credentials 293 linked to the primary standard cloud user 292 from the identity store 12.
5. Using the read credentials 292, the secondary cloud communicator 13 may contact the standard cloud service 21 to verify the status of the shadow instance 24.
6. The instance lifecycle manager 17 may change the state of the secure instance 25 to correctly reflect the state of the shadow instance 24 reported by the standard cloud service 21.

In one embodiment, the secure instance 25 state may not be the same as the primary standard cloud shadow instance 24 state. For example, if a shadow instance 24 is stopped, a corresponding secure instance 25 may be resumed or started. Such a mapping also covers lifecycle endowment between cloud services that do not have the exact same state representations for instances.

In one embodiment, the notifications handler 19 may subscribe to notifications from the standard cloud service 21 about instance state changes. Notifications may include an identifier for the shadow instance 24 whose state has changed in the standard cloud service 21. On receipt of such a notification, the notifications handler 19 may trigger the following process.

1. The notifications handler 19 may extract the shadow instance 24 identifier from the notification.
2. The instance lifecycle manager 17 may locate the secure instance 25 linked with the shadow instance 24 from the identity store 12.
3. The instance lifecycle manager 17 may change the state of the secure instance 25 to the state of the shadow instance 24 reported in the notification.

Secure connections. The primary insecure and secondary secure cloud services may be separated communication channels of different trust levels. For example, parts of the traffic may traverse the untrusted internet or be routed via direct network connections. It may be desirable to preserve expected client-to-instance security guarantees irrespective of the inter-cloud communication channels.

In one embodiment, encrypted communication channels along with network tunnelling mechanisms may be used to achieve secure connections.

Security of data in transit may be preserved via multiple encrypted communication channels. Data sent over an encrypted communication channel can only be decrypted by authorized endpoints. Any other entity simply acting as a communication hop cannot decrypt the data. Common examples of encrypted communication channels include SSH and IPSEC.

Tunnelling refers to the mechanism by which data of one communication channel (encapsulated channel) is transferred over (or contained within) another communication channel (encapsulating channel).

Data transferred over an encapsulated encrypted communication channel can only be decrypted by endpoints of the encapsulated encrypted communication channel and not by the endpoints of the encapsulating encrypted communication channel. An encapsulating channel by definition is established prior to an encapsulated channel.

Channel encapsulation may be transitive. That is, an encapsulating communication channel may itself be encapsulated by another channel. For example, FIG. 2 shows channel 33 encapsulating channel 34 and at the same time being encapsulated by channel 31.

In one embodiment, referring to FIG. 2, the following encrypted communication channels and channel tunnelling schemes may be used.

30 represents a secure, encrypted communication channel between a client 23 and a shadow instance 24. This channel may be used by the client for example to manage the shadow instance 24. Data sent over this channel in any direction can be accessed (e.g., read or modified) only by the client 23 and the shadow instance 24.

31 represents an encrypted communication channel between an insecure and a secure cloud service. An example may be an IPSEC-based Virtual Private Network (VPN) channel. Endpoints of the channel 31 may be represented by "virtual routers" hosted by the cloud services. Setup and maintenance of this channel may be handled by the cloud services themselves. Data sent over this channel in any direction can be accessed (e.g., read or modified) by both the standard cloud service 21 and the secure cloud service 22.

31 acts as an encapsulating channel for channel 33.

33 represents a secure communication channel between a shadow instance 24 and a secure instance 25. Data sent over this channel can be accessed only by the insecure 24 and secure 25 instances.

33 acts as an encapsulating channel for channels 32 and 34. Further, there may be multiple channels encapsulated within a single channel. For example, there may be multiple channels 34 (one per application) encapsulated within a single channel 33.

32 represents a secure, encrypted communication channel between a client 23 and a secure instance 25. This channel may be used by the client 23 for example to manage the secure instance 25. Data sent over this channel can be accessed only by the client 23 and the secure instance 25.

34 represents a secure, encrypted channel between a secure instance 25 (or a client application executing within a secure instance) and one or more of: (i) a client 23, (ii) other VEEs in a standard cloud service 21, and (iii) another endpoint 26 external to the insecure and secure cloud services.

In brief, channel 34 may carry application-level traffic for applications executing within a secure instance 25. The application 701 executing within a secure instance 25 may be one endpoint of the channel 34. Examples of applications 701 include Web servers, database management systems (DBMS), and any custom application. One example of channel 34 may be a TLS connection between a client 23 and a web server 701 executing within a secure instance 25.

Hence, the above described resource use step according to the inventive method may comprise an encapsulating cryptographically secured channel 33 being established between the shadow instance 24 and the secondary cloud resource, which encapsulating channel 33 is furthermore caused to encapsulate a control communication channel between the external client or user 23 and the secondary cloud resource and/or a communication channel between the external client or user 23 and an application 701 executing within an execution environment 25 provided by the secondary cloud resource.

Network forwarding. It may be desirable to ensure that network traffic gets transparently forwarded from the shadow instance 24 to the secure instance 25. Further, it may be desirable that also other network-specific properties such as firewalling and traffic shaping rules and properties are also applied to the secure instance 25 so as to provide seamless operation and maximal transparency to a primary insecure cloud client 23.

To this end, in one embodiment, both the shadow instance 24 and the secure instance 25 may run network translator modules 53, 63 respectively to intercept each incoming network packet that has the destination address as an insecure instance's 25 network address.

The standard instance 24 network translator 53 may then encapsulate the packet into a packet of the encrypted communication channel 33 and transmits the packet to the secure instance 25.

The secure instance 25 network translator 63 may remove the encapsulation and provide the original packet that was received by the shadow instance 24 to an endpoint (e.g., a running application 701) within the secure instance 25.

More specifically, for shadow instance ingress traffic, this may be achieved as follows (refer to FIGS. 2, 5, 6, and 8).
1. A network packet 830 may be received by a shadow instance 24, e.g., from a client 23 or from elsewhere.
2. The network translator 53 may translate the received packet 830 to create a packet 831 wherein the shadow instance 24 address may be replaced with the secure instance 25 address.
3. The network translator 53 may encapsulate the created packet 831 inside an encapsulating packet 832 and may transmit the packet 832 to the primary standard cloud service VPN gateway 27, or otherwise to be received by the secure instance 25 network translator 63.
4. The VPN Gateway 27 may encapsulate the received packet 832 inside a second encapsulating packet 833 and may transmit the packet 833 to the secure cloud service VPN gateway 28.
5. The secure cloud service VPN gateway 28 may decapsulate packet 833 to access packet 832 and may then transmit packet 832 to the secure instance 25.
6. The secure instance 25 network translator 63 may decapsulate packet 832 to access packet 831 and may transmit the packet 831 to its endpoint (e.g., a running application 701 in the secure instance 25)

The standard instance 24 network translator 53 may preserve network ports, i.e., incoming packets may be forwarded to a secure instance 25 over the channel 33 at the same network ports as their incoming port at the insecure shadow instance 24.

Alternately, port re-mapping may be applied in which packets get delivered to different ports at the secure instance 25 than the ports they were originally received on at the shadow instance 24.

Similarly, for egress traffic from the secure instance 25, the secure instance 25 network translator 63 may intercept outgoing network packets, may encapsulate the packets into packets of the encrypted communication channel 33, and may transmit the packets to the shadow instance 24. The network translator 53 in the shadow instance 24 may remove the encapsulation and may then replace the secure instance's 25 source address in the packet with the shadow instance 24 address. Finally, the network translator 53 may forward the packet based on the destination address contained within the packet.

As a result of the address translation described above, the destination may perceive the said outgoing packet(s) to have originated with the shadow instance 24. In detail, for such egress traffic, processing may proceed as follows.
1. An outbound packet 840 may be created by a packet source such as an application 701 running in the secure instance 25.
2. The secure instance 25 network translator 63 may encapsulate the packet 840 inside an encapsulating packet 841 and may transmit packet 841 to the secure cloud service VPN gateway 28, or otherwise to be received by the shadow instance 24 network translator 53.
3. The secure cloud service VPN gateway 28 may encapsulate the packet 841 inside a second encapsulating packet 842 and transmit the packet 842 to the primary standard cloud service VPN gateway 27.
4. The standard cloud service VPN gateway 27 may decapsulate the received packet 842 to access the packet 841 encapsulated therein and may transmit said packet 841 to the shadow instance 24.
5. The shadow instance 24 network translator 53 may decapsulate said packet 841 to access the original outbound packet 840.
6. The shadow instance 24 network translator 53 may translate said original outbound packet 840 to create a packet 843 wherein its source address is replaced with the shadow instance 24 source address.
7. The network translator 53 may transmit packet 843 to its destination.

We note that in certain embodiments, for the ingress scenario or the egress scenario or both, any and all of the standard cloud service VPN gateway 27, the secondary cloud service VPN gateway 28, and encapsulation channel 31 may be missing. For example, the shadow instances 24 may directly communicate with their corresponding secure instances 25 using an inter-instance secure channel 33.

FIG. 16 illustrates an integration mechanism using one or several shadow instances 24 running in the primary cloud connecting back to secure instances 25 running in the secondary secure cloud, which may be a cloud of the CipherRack type as described above.

FIG. 15 illustrates a primary-secondary integration mechanism using mainly cloud-level VPN mechanisms in which clouds connect to each other first using a VPN and then instances from the secondary cloud may be connected directly to client networks in the primary cloud. It is noted that, in the embodiment illustrated in FIG. 15, shadow instances 24 are used.

In this case illustrated in FIG. 15, secure instances 25 in the secondary cloud service 22 may be connected using standard VPN mechanisms to the customer VPN (VPNs are also named VPC by certain cloud providers). Such standard mechanisms may comprise VPN gateways 27,28 (refer to FIG. 2) e.g., in the primary and secondary clouds.

The customer VPN may be established by the primary cloud provider 21 and may connect and span multiple standard primary provider 21 cloud instances as well as other customer servers or cloud instances possibly hosted elsewhere, e.g., in customer's private clouds, data centers, or in other public cloud providers.

To this end, a secure VPN connection between a customer-specific network allocated in the secondary cloud 22 and one or more of the customer's VPNs (e.g., in the primary cloud service 21) may be established. This may happen statically before any instance allocation takes place, or dynamically on-demand, as the customer starts using the secure instances 25.

In either case, additional transparency may be possible by packaging the necessary VPN-specific tools as part of the integration adapter 10 and establishing long-lived VPN connections that can be reused for months or years without additional user interaction. Once an inter-cloud VPN is established, secure instance management tools can be provided to primary cloud 21 users that automatically connect secure instances 25 to the appropriate VPN and allow cloud users to access the secure instances 25 using primary cloud 21 local network addresses.

The advantages of using an approach without shadow instances 24 may include reduced costs (e.g., as there may be no need for shadow instances 24 running in the primary cloud service 21). Disadvantages may include decreased transparency—since users may need to be aware of the need to set up the VPN connections, and less predictable networking behaviour—since traffic now may be managed by the VPN connection mechanism of the cloud providers 24, 25 and individual VPN connections may carry traffic from multiple clients and multiple secure instances 25. Correspondingly, shadow instances 24 may add some cost, but on the other hand may provide secure resources in a transparent manner, as described herein.

A combination approach using shadow instances and VPNs may also be desirable, e.g., for certain applications, shadow instances 24 may offer better and more predictable network traffic behaviour, whereas for other applications the more cost-effective VPN-based approach may offer a more appropriate trade-off.

Additionally, it is noted that a single shadow instance 24 may be connecting to and handling multiple secure instances 25. In this case, the shadow instance 24 may be partitioned to allow this one-to-many mapping. For example, different shadow instance 24 networking ports may be allocated to correspond to different secure instances 25, etc.

Specifically, e.g., traffic incoming on ports 6001-7000 of the shadow instance 24 may be directed to ports 2001-3000 on a first secure instance 25, traffic incoming on ports 7001-8000 of the shadow instance 24 may be directed to ports 2001-3000 on a second secure instance 25, and so on. This illustrates one of several embodiments that allows one shadow instance 24 to map to multiple secure instances 25.

Similarly, note that multiple shadow instances 24 may be connecting to and handling a single secure instance 25. In this case, the secure instance 25 may be partitioned to allow this many-to-one mapping. For example, different secure instance 25 networking ports may be allocated to correspond to different shadow instances 24 etc.

Specifically, e.g., traffic incoming on ports 2001-3000 of a first shadow instance 24 may be directed to ports 2001-3000 on the secure instance 25, traffic incoming on ports 2501-3000 of a second shadow instance 24 may be directed to ports 4001-4500 on the secure instance 25, and so on. This means that multiple shadow instances 24 are used to map to a single secure instance 25.

In particular in the case in which the inventive method comprises performing the said shadow instance 24 initiation step several times, resulting in several shadow instances 24 each corresponding to a different respective secondary cloud resource, the method may further also comprise a control unit of the primary cloud service 21 allowing the external user or client 23 to access said several shadow instances 24, and in particular so as to achieve load balancing and/or automatic load scaling.

Such load balancing and automatic load scaling will now be described in closer detail.

Load balancing. Often it may be desirable to have functions such as load balancing work transparently across a set of shadow instances 24 and other primary cloud instances. This is inherently possible because, as discussed above, network traffic is forwarded between shadow instances 24 and their corresponding secure cloud instances 25.

Figure 7:
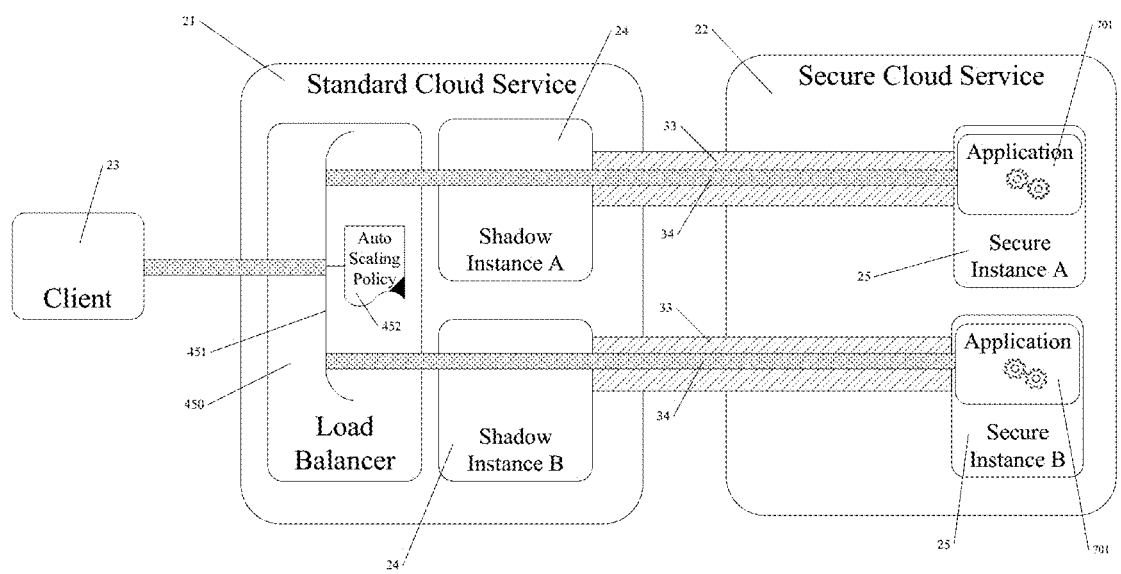
FIG. 7 illustrates how load balancing and auto scaling mechanisms in a primary standard cloud service provider may be applied transparently to manage and deliver services provided by a secondary secure cloud service provider.
Figure 8:
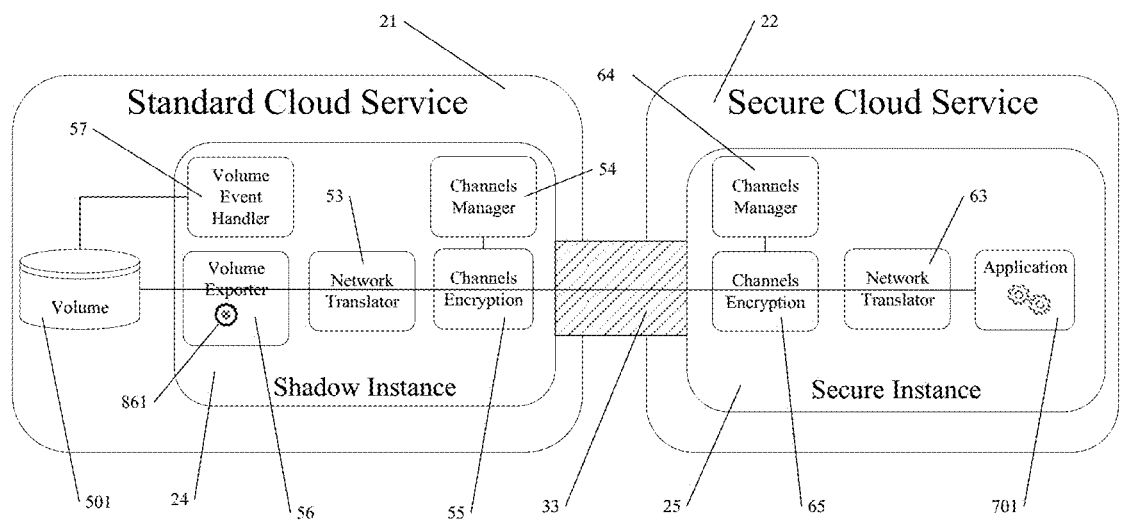
FIG. 8 illustrates how storage provided by the primary standard cloud service provider may be used in conjunction with (e.g., "mounted on") a secure cloud instance provided by a secondary secure cloud service provider.

Referring to FIG. 7, it is noted that a load balancer 450 may be run in the standard primary cloud service 21, possibly in conjunction to an auto-scaling policy 452. The load balancer 450 may apply a variety of algorithms such as round-robin algorithm or load-based, to determine which secure instances to direct incoming service requests to. These service request may come from clients, or other logic that may need to use the services provided by the load-balanced application 701.

Auto scaling. Often it may be desirable to have functions such as auto scaling work transparently for clients of the primary cloud service.

This is inherently possible because, as discussed above:
(i) Network traffic is forwarded between shadow instances 24 and their corresponding secure cloud instances 25, and
(ii) Lifecycle events are mapped transparently between shadow instances 24 and their corresponding secure cloud instances 25.

Again, referring to FIG. 7, it is noted that a load balancer 450 may be run in the standard primary cloud service 21, possibly in conjunction to an auto-scaling policy and mechanism 452. The auto scaling policy 452 may respond to changing load by for example triggering the creation or termination of additional secure instances 25 (and of corresponding shadow instances 24, if appropriate), depending on parameters such as increasing inbound traffic, running instance CPU load etc.

In some embodiments, the shadow instance 24 initiation step may further comprise the allocation of a primary cloud service resource, and the mounting of said primary cloud service resource in said secondary cloud resource for use by the secondary cloud resource in the resource use step. Such primary cloud service resource may, for instance, be a digital storage resource.

Storage: Hence, it may be desirable to transparently enable volume and other types of data storage to work with shadow instances. Specifically, it may be desirable to have e.g., a data volume 501 attached to a shadow instance 24 in a primary standard cloud service 21 become transparently accessible to an application 701 executing in the corresponding secure instance 25. It may also be desirable that the application 701 does not need to be aware (and may also actually be unaware) that the volume 501 was created and resides in a standard cloud service 21. In one embodiment, this may be achieved using the following method (refer to FIG. 8).

1. A shadow instance 24 may be allocated together with a corresponding secure instance 25 running in a secure cloud service 22. The lifecycle of the shadow instance 24 and secure instance 25 are linked as discussed above under "Instance lifecycle".

2. One or more volumes 501 may be allocated in the standard cloud service 21.
3. The volumes 501 may be attached to shadow instance 24 in the standard cloud service 21.
4. The shadow instance 24 volume event handler 57 may be designed to detect and react to attachment of volumes 501 and may trigger a "volume export" using the shadow instance 24 volume exporter 56.
5. The volume exporter 56 may create a network-accessible target 861 (e.g., using the iSCSI or NFS protocols) for the attached volume 501.
6. An application 701 running in a secure instance 25 may issue a volume access request (e.g., mount, read, write etc.) to exported target 861.
7. The secure instance 25 network translator 63 may intercept the volume access request and may transmit it to the shadow instance 24 over a secure channel 33. The secure instance 25 channel encryption module 65 may separately encrypt the request which may be decrypted by the shadow instance 24 channel encryption module 55.
8. The shadow instance 24 network translator 53 may direct the request to the network-accessible volume target 861.
9. The shadow instance 24 volume exporter 56 may execute the volume access request and may generate a response.
10. The shadow instance 24 network translator 53 may transmit the response to the secure instance 25 over the secure channel 33.
11. The secure instance 25 network translator 63 may receive the response and may transmit it to the application 701.
12. Application 701 residing in the secure instance 25 may access the volume 501 residing in a standard cloud service 21 as if the volume were part of the secure cloud service 22.
13. For protection, the secure instance 25 may encrypt data written to the volume e.g., using standard volume (block)-level encryption mechanisms.

Private endpoint services. It may be desirable to have also other services running as private endpoints in a standard cloud service 21 transparently accessible to applications 701 running within a secure instance 25. This is inherently possible because, as discussed above, network traffic is forwarded between shadow instances 24 and their corresponding secure cloud instances 25. A simple example of such a service is an object or block storage service. For security, when using a private endpoint storage service, the secure instance 25 may encrypt data before sending to the service and decrypt it when receiving from the service. This may ensure the service can never access unencrypted data.

Application execution. Similarly, it may be desirable to have applications 701 running in a secure instance 25 be transparently exposed to external and primary cloud hosted vantage points as if they would be running in a shadow instance 24. This is naturally achieved as a combined effect of lifecycle event mapping, and network traffic forwarding as discussed above.

Multiple secondary clouds. It may be desirable to allow a primary cloud and its clients to benefit from the security properties of multiple secondary clouds (refer to FIG. 17).

This may be achieved by deploying multiple secondary cloud-specific shadow instance types, each type mapping to a different secondary cloud. Separate mechanisms for network traffic forwarding, lifecycle events and other properties mapping are then addressing each secondary cloud individually.

Multiple primary clouds. Similarly, it may be desirable to allow a secondary secure cloud service to provide its services to multiple primary clouds simultaneously. The mechanisms and systems discussed above may allow this by deploying multiple integration adapters, e.g., one adapter for each primary cloud and then tasking adapters to work together and carefully and consistently handle network forwarding, lifecycle events and properties mapping.

More specifically (refer to FIGS. 11 and 12) a secure cloud service 22 may comprise two integration adapters, adapter-A 10 and adapter-B 10. Adapter-A enables endowment with standard cloud service-A and adapter-B enables endowment with standard cloud service-B.

Direct customer connection. Further, it may be desirable to allow customers to directly use the services of a secure secondary cloud service 22. FIG. 13 illustrates the case where this may be advantageous because the secure cloud 22 (of the "CipherRack" type, above) may be hosted in a data center in closer network proximity to the customer than standard public clouds A and B. In this situation, individual clients under the customer's accounts may use the secure cloud service 22 interfaces and tools directly.

Direct customer cloud connection. Additionally, it may be desirable for the standard customer clouds 21 or data centers to directly integrate with and use secure secondary cloud services 22, possibly in a more transparent fashion, e.g., using the standard customer cloud 21 interfaces and tools. This is illustrated in FIG. 14. This may be advantageous because clients may not need to use new interfaces and tools but instead use familiar existing standard primary customer cloud 21 interfaces and tools.

An integration adapter 10 between the customer standard cloud 21 and the secure cloud 22 may be deployed to enable this integration.

Direct customer cloud connections may be advantageous also because the secure cloud 22 (possibly of the "CipherRack" type) may be hosted in a data center in closer network proximity to the customer than standard public clouds A and B.

In addition to a method, the present invention also relates to an integration adapter 10 for the integrated use of a secondary cloud resource of the type described above, provided by the secondary cloud service 22 software function (executed on said primary hardware), from the primary cloud service 21, provided by the primary cloud service software function executed on said secondary hardware which is remote to said primary hardware.

Such an integration adapter 10 comprises or may be arranged to communicate with the integration database. It may run said integration software function, which integration software function may be arranged to provide said primary integration interface and said secondary integration interface.

The integration adapter 10 may be arranged to, in a resource request step in which the integration software function receives, via the said primary integration interface, an allocation request regarding a certain cloud resource, in response thereto identify a set of secondary user data and to request, via the secondary integration interface, said secondary cloud resource from the secondary cloud service, the secondary cloud resource request being performed using said secondary user data.

The integration adapter 10 may be further arranged to, in a subsequent resource allocation step, receive, from the secondary cloud service, via the secondary integration interface, secondary cloud resource allocation information corresponding to an allocated secondary cloud resource.

The integration adapter 10 may be further arranged to, in a subsequent information association step, associate, in the integration database, said secondary cloud resource allocation information with said secondary cloud user data and also with a set of primary user data, identifying a primary cloud service user.

Moreover, the integration adapter 10 may be arranged to, in a subsequent user authentication step, authenticate the primary cloud service user access to said secondary cloud resource, by identifying in said integration database said secondary user data based upon said primary user data and to authenticate, via said secondary integration interface, said secondary user data with the secondary cloud service.

The invention further relates to the integration adapter software function, which may be arranged to perform the above described inventive method, and which integration adapter function may be arranged to, when executed on or in the integration adapter 10 described herein, perform the functionality of the integration adapter 10 as described above.

It is noted that such integration adapter software function may be stored and executed on the hardware of the integration adapter 10, in case the latter is a hardware device, and in particular in this case stored on a digital memory and executed on a processor of the integration adapter 10. In case the integration adapter 10 is a virtual instance, the corresponding is true, but using a memory and a processor of hardware underlying said virtual instance.

Above, preferred embodiments have been described. However, it is apparent to the skilled person that many modifications can be made to the disclosed embodiments without departing from the basic idea of the invention.

For instance, many other functions may be implemented in the first 21 and second 22 cloud services, apart from the ones described above.

In general, everything which has been said about the method is equally applicable to the integration adapter and the integration software function, and vice versa.

Hence, the invention is not limited to the described embodiments, but can be varied within the scope of the enclosed claims.

The invention claimed is:

1. Method for the integrated use of a secondary cloud resource, provided by a secondary cloud service software function executed on physically tamper-proof secondary hardware, from a primary cloud service, provided by a primary cloud service software function executed on primary hardware which is remote to said secondary hardware, the method comprising
   in a provision step, providing an integration database as well as an integration software function, which integration software function is arranged to provide a primary integration interface and a secondary integration interface;
   in a shadow instance initiation step, initiating a shadow instance as a shadow software function executing in an execution environment of said primary cloud service and providing or constituting a primary cloud resource corresponding to said secondary cloud resource;
   in a resource request step, the integration software function receiving from the shadow instance, via the said primary integration interface, an allocation request regarding a certain cloud resource, and the integration software function in response thereto identifying a set of secondary user data and requesting, via the secondary integration interface, said secondary cloud resource from the secondary cloud service, the secondary cloud resource request being performed using said secondary user data;
   in a resource allocation step, the secondary cloud service allocating the requested secondary cloud resource and providing, via the secondary integration interface, corresponding secondary cloud resource allocation information to the integration software function;
   in an information association step, the integration software function associating, in the integration database, said secondary cloud resource allocation information with said secondary cloud user data and also with a set of primary user data, identifying the shadow instance;
   in a user authentication step, the integration software function authenticating the primary cloud service user access to said secondary cloud resource, by identifying in said integration database said secondary user data based upon said primary user data and authenticating, via said secondary integration interface, said secondary user data with the secondary cloud service;
   in a resource use step, the shadow instance receiving a use request for its primary cloud resource from an external client and in turn initiating a corresponding use request to the secondary cloud service for the secondary cloud resource, and an encapsulating cryptographically secured channel further being established between the shadow instance and the secondary cloud resource, which encapsulating channel is furthermore caused to encapsulate at least one of a control communication channel between the external user and the secondary cloud resource and a communication channel between the external user and an application executing within an execution environment provided by the secondary cloud resource; and
   wherein the integration software function is an adapter function, arranged to translate primary cloud service API calls to corresponding secondary cloud service API calls and vice versa, which primary and secondary cloud service API calls are formatted differently.

2. Method according to claim 1, wherein at least one of the primary integration interface is compatible with a primary cloud service API and the secondary integration interface is compatible with a secondary cloud service API, and wherein the integration software function translates API calls between a primary cloud service API and a secondary cloud service API.

3. Method according to claim 1, wherein the integration software function is executed on hardware of an integration adapter, in turn providing communication interfaces for integrating the first and second cloud services.

4. Method according to claim 1, wherein the integration software function is executed as a part of the secondary cloud service.

5. Method according to claim 1, wherein the primary user data comprises at least one of user and/or account credentials for the primary cloud service user, and wherein the primary user data is provided to the integration software function via the said primary integration interface.

6. Method according to claim 5, wherein in the user authentication step the integration software function identifies a user access policy pertaining to the primary cloud service user and applies the said user access policy to said authentication with the secondary cloud service.

7. Method according to claim 6, wherein the method further comprises a step in which the integration software function, via the primary integration interface, verifies the accuracy of the at least one of primary user and/or account credentials, and, if said credentials are accurate, updates information pertaining to said user access policy in the integration database.

8. Method according to claim 1, wherein the secondary user data comprises at least one of user and account credentials for the secondary user, wherein the resource request step comprises the integration software function requesting, via the secondary integration interface, the creation of the secondary user from the secondary cloud service.

9. Method according to claim 1, wherein in the shadow instance initiation step, the primary user data is provided by an external user to the shadow instance.

10. Method according to claim 1, wherein the shadow instance initiation step, the shadow software function is provided by an external user to the primary cloud service.

11. Method according to claim 1, wherein in the method further comprises that
in the information association step, the integration software function associates in the integration database the shadow instance with the secondary cloud resource; and
wherein the method further comprises a shadow instance state change detecting step in which a state change of the shadow instance is detected by the integration software function, wherein the integration software function in reaction to such detection, via the secondary integration interface, initiates a corresponding state to a corresponding instance providing the secondary cloud resource.

12. Method according to claim 1, wherein the method comprises performing the shadow instance initiation step several times, resulting in several shadow instances each corresponding to a different respective secondary cloud resource, and in that the method further comprises a control unit of the primary cloud service allowing the external user to access said several shadow instances so as to achieve at least one of load balancing and automatic load scaling.

13. Method according to claim 1, wherein the shadow instance initiation step further comprises the allocation of a primary cloud service resource, and the mounting of said primary cloud service resource in said secondary cloud resource for use by the secondary cloud resource in the resource use step.

14. Method according to claim 1, wherein the secondary cloud resource is an execution environment in which a user-specific application is allowed to be loaded and executed.

15. Method for the integrated use of a secondary cloud resource, provided by a secondary cloud service software function executed on physically tamper-proof secondary hardware, from a primary cloud service, provided by a primary cloud service software function executed on primary hardware which is remote to said secondary hardware, the method comprising
in a provision step, providing an integration database as well as an integration software function, which integration software function is arranged to provide a primary integration interface and a secondary integration interface;
in a shadow instance initiation step, initiating a shadow instance as a shadow software function executing in an execution environment of said primary cloud service and providing or constituting a primary cloud resource corresponding to said secondary cloud resource;
in a resource request step, the integration software function receiving from the shadow instance, via the said primary integration interface, an allocation request regarding a certain cloud resource, and the integration software function in response thereto identifying a set of secondary user data and requesting, via the secondary integration interface, said secondary cloud resource from the secondary cloud service, the secondary cloud resource request being performed using said secondary user data;
in a resource allocation step, the secondary cloud service allocating the requested secondary cloud resource and providing, via the secondary integration interface, corresponding secondary cloud resource allocation information to the integration software function;
in an information association step, the integration software function associating, in the integration database, said secondary cloud resource allocation information with said secondary cloud user data and also with a set of primary user data, identifying the shadow instance;
in a user authentication step, the integration software function authenticating the primary cloud service user access to said secondary cloud resource, by identifying in said integration database said secondary user data based upon said primary user data and authenticating, via said secondary integration interface, said secondary user data with the secondary cloud service;
in a resource use step, the shadow instance receiving a use request for its primary cloud resource from an external client and in turn initiating a corresponding use request to the secondary cloud service for the secondary cloud resource, and an encapsulating cryptographically secured channel further being established between the shadow instance and the secondary cloud resource, which encapsulating channel is furthermore caused to encapsulate at least one of a control communication channel between the external user and the secondary cloud resource and a communication channel between the external user and an application executing within an execution environment provided by the secondary cloud resource;
wherein in the information association step, the integration software function associates in the integration database the shadow instance with the secondary cloud resource; and
wherein the method further comprises a shadow instance state change detecting step in which a state change of the shadow instance is detected by the integration software function, wherein the integration software function in reaction to such detection, via the secondary integration interface, initiates a corresponding state to a corresponding instance providing the secondary cloud resource.

16. Method for the integrated use of a secondary cloud resource, provided by a secondary cloud service software function executed on physically tamper-proof secondary hardware, from a primary cloud service, provided by a primary cloud service software function executed on primary hardware which is remote to said secondary hardware, the method comprising
in a provision step, providing an integration database as well as an integration software function, which integration software function is arranged to provide a primary integration interface and a secondary integration interface;
in a shadow instance initiation step, initiating a shadow instance as a shadow software function executing in an execution environment of said primary cloud service and providing or constituting a primary cloud resource corresponding to said secondary cloud resource;
in a resource request step, the integration software function receiving from the shadow instance, via the said primary integration interface, an allocation request regarding a certain cloud resource, and the integration software function in response thereto identifying a set of secondary user data and requesting, via the secondary integration interface, said secondary cloud resource from the secondary cloud service, the secondary cloud resource request being performed using said secondary user data;

in a resource allocation step, the secondary cloud service allocating the requested secondary cloud resource and providing, via the secondary integration interface, corresponding secondary cloud resource allocation information to the integration software function;

in an information association step, the integration software function associating, in the integration database, said secondary cloud resource allocation information with said secondary cloud user data and also with a set of primary user data, identifying the shadow instance;

in a user authentication step, the integration software function authenticating the primary cloud service user access to said secondary cloud resource, by identifying in said integration database said secondary user data based upon said primary user data and authenticating, via said secondary integration interface, said secondary user data with the secondary cloud service;

in a resource use step, the shadow instance receiving a use request for its primary cloud resource from an external client and in turn initiating a corresponding use request to the secondary cloud service for the secondary cloud resource, and an encapsulating cryptographically secured channel further being established between the shadow instance and the secondary cloud resource, which encapsulating channel is furthermore caused to encapsulate at least one of a control communication channel between the external user and the secondary cloud resource and a communication channel between the external user and an application executing within an execution environment provided by the secondary cloud resource; and wherein the method comprises performing the shadow instance initiation step several times, resulting in several shadow instances each corresponding to a different respective secondary cloud resource, and in that the method further comprises a control unit of the primary cloud service allowing the external user to access said several shadow instances so as to achieve at least one of load balancing and automatic load scaling.

17. Method for the integrated use of a secondary cloud resource, provided by a secondary cloud service software function executed on physically tamper-proof secondary hardware, from a primary cloud service, provided by a primary cloud service software function executed on primary hardware which is remote to said secondary hardware, the method comprising in a provision step, providing an integration database as well as an integration software function, which integration software function is arranged to provide a primary integration interface and a secondary integration interface;

in a shadow instance initiation step, initiating a shadow instance as a shadow software function executing in an execution environment of said primary cloud service and providing or constituting a primary cloud resource corresponding to said secondary cloud resource;

in a resource request step, the integration software function receiving from the shadow instance, via the said primary integration interface, an allocation request regarding a certain cloud resource, and the integration software function in response thereto identifying a set of secondary user data and requesting, via the secondary integration interface, said secondary cloud resource from the secondary cloud service, the secondary cloud resource request being performed using said secondary user data;

in a resource allocation step, the secondary cloud service allocating the requested secondary cloud resource and providing, via the secondary integration interface, corresponding secondary cloud resource allocation information to the integration software function;

in an information association step, the integration software function associating, in the integration database, said secondary cloud resource allocation information with said secondary cloud user data and also with a set of primary user data, identifying the shadow instance;

in a user authentication step, the integration software function authenticating the primary cloud service user access to said secondary cloud resource, by identifying in said integration database said secondary user data based upon said primary user data and authenticating, via said secondary integration interface, said secondary user data with the secondary cloud service;

in a resource use step, the shadow instance receiving a use request for its primary cloud resource from an external client and in turn initiating a corresponding use request to the secondary cloud service for the secondary cloud resource, and an encapsulating cryptographically secured channel further being established between the shadow instance and the secondary cloud resource, which encapsulating channel is furthermore caused to encapsulate at least one of a control communication channel between the external user and the secondary cloud resource and a communication channel between the external user and an application executing within an execution environment provided by the secondary cloud resource; and wherein the shadow instance initiation step further comprises the allocation of a primary cloud service resource, and the mounting of said primary cloud service resource in said secondary cloud resource for use by the secondary cloud resource in the resource use step.

* * * * *